US012787100B2

(12) United States Patent
Wang et al.

(10) Patent No.: US 12,787,100 B2
(45) Date of Patent: Nov. 3, 2026

(54) METHODS, DEVICES AND COMPUTER STORAGE MEDIA FOR COMMUNICATION

(71) Applicant: NEC CORPORATION, Tokyo (JP)

(72) Inventors: Gang Wang, Beijing (CN); Yukai Gao, Beijing (CN)

(73) Assignee: NEC CORPORATION, Tokyo (JP)

( * ) Notice: Subject to any disclaimer, the term of this patent is extended or adjusted under 35 U.S.C. 154(b) by 333 days.

(21) Appl. No.: 18/579,080

(22) PCT Filed: Jul. 14, 2021

(86) PCT No.: PCT/CN2021/106350
§ 371 (c)(1),
(2) Date: Jan. 12, 2024

(87) PCT Pub. No.: WO2023/283844
PCT Pub. Date: Jan. 19, 2023

(65) Prior Publication Data
US 2024/0324047 A1 Sep. 26, 2024

(51) Int. Cl.
*H04W 76/20* (2018.01)
*H04B 7/06* (2006.01)
(Continued)

(52) U.S. Cl.
CPC .......... *H04W 76/20* (2018.02); *H04B 7/0626* (2013.01); *H04W 16/28* (2013.01); (Continued)

(58) Field of Classification Search
CPC ... H04W 76/20; H04W 76/19; H04W 72/231; H04W 16/28; H04W 24/08; H04B 7/0626
See application file for complete search history.

(56) References Cited

U.S. PATENT DOCUMENTS 11,658,727 B2 * 5/2023 Farag .................. H04B 7/0617 370/329
2020/0267748 A1 * 8/2020 Khoshnevisan ...... H04L 1/0013
(Continued)

FOREIGN PATENT DOCUMENTS

JP WO2020/012619 A1 1/2020
WO 2019/137509 A1 7/2019
(Continued)

OTHER PUBLICATIONS

Intel, "AdHoc Minutes for Signal Characteristics", 3GPP TSG-RAN4 Meetings #92 Ljubljana, SI, Aug. 26-30, 2019, R4-1910009 (15 pages).
(Continued)

*Primary Examiner* — Duc C Ho

(57) ABSTRACT

Embodiments of the present disclosure relate to methods, devices and computer storage media for communication. A terminal device receives a configuration concerning random resource selection. The terminal device transmits, to a network device, information related to a target TCI state in a first set of TCI states for transmission between the terminal device and the network device. The first set of TCI states is at least partially non-overlapping with a second set of TCI states which have been activated. The target TCI state is outside the second set of TCI states. After that, the terminal device sets at least the target TCI state in the first set of TCI states as activated. As a result, MAC CE activation will not be required. Thus, signaling overhead and latency will be reduced.

2 Claims, 16 Drawing Sheets

(51) Int. Cl.
*H04W 16/28* (2009.01)
*H04W 24/08* (2009.01)
*H04W 72/231* (2023.01)
*H04W 76/19* (2018.01)

(52) U.S. Cl.
CPC ......... *H04W 24/08* (2013.01); *H04W 72/231* (2023.01); *H04W 76/19* (2018.02)

(56) References Cited

U.S. PATENT DOCUMENTS

| | | | | |
|---|---|---|---|---|
| 2020/0389884 | A1 | 12/2020 | Hakola et al. | |
| 2020/0404559 | A1 | 12/2020 | Koskela et al. | |
| 2021/0084625 | A1* | 3/2021 | Ryu | H04W 56/0015 |
| 2021/0195624 | A1 | 6/2021 | Venugopal et al. | |
| 2022/0225384 | A1* | 7/2022 | Takeda | H04W 72/04 |
| 2024/0324047 | A1* | 9/2024 | Wang | H04W 24/08 |
| 2026/0012970 | A1* | 1/2026 | Bai | H04W 72/535 |

FOREIGN PATENT DOCUMENTS

| | | | |
|---|---|---|---|
| WO | 2019/138070 | A1 | 7/2019 |
| WO | 2021/007854 | A1 | 1/2021 |
| WO | 2021/078240 | A1 | 4/2021 |

OTHER PUBLICATIONS

Nokia et al., "Remaining Details on Beam Recovery", 3GPP TSG-RAN WG1 NR AH#1801 Vancouver, Canada, Jan. 22-26, 2018, R1-1800752 (4 pages).

Extended European Search Report dated Jul. 26, 2024 in Application No. 21949636.1.

Japanese Office Action dated May 13, 2025 in Application No. 2024-501867.

European Office Action for EP Application No. 21949636.1, mailed on Jun. 25, 2026.

Intel Corporation: "Enhancements to Multi-Beam Operation", 3GPP Draft; R1-2104888, May 19-27, 2021.

Japanese Office Action for JP Application No. 2025-146682, mailed on Aug. 12, 2026 with English Translation.

MediaTek Inc., "Enhancement on multi-beam operation", 3GPP TSG RAN WG1 #105-e R1-2105353, May 10-27, 2021.

Qualcomm Incorporated, "Enhancements on Multi-beam Operation", 3GPP TSG RAN WG1 #105-e R1-2104654, May 10-27, 2021.

* cited by examiner

METHODS, DEVICES AND COMPUTER STORAGE MEDIA FOR COMMUNICATION

This Application is a National Stage of International Application No. PCT/CN2021/106350 filed Jul. 14, 2021.

TECHNICAL FIELD

Embodiments of the present disclosure generally relate to the field of telecommunication, and in particular, to methods, devices and computer storage media for beam management enhancements.

BACKGROUND

Mobile communication involves the transmissions between a terminal device and a network device. In recent communication systems, for example the new radio access system which is also called NR system or NR network, a terminal device and a network device may communicate via a plurality of beams. To this end, is has been proposed to use beam management to enhance transmissions between the terminal device and the network device. The beam management is a mechanism for acquiring and maintaining a set of beams for transmissions and receptions, and/or detecting beam failures and recovering beams for transmissions. Work is ongoing to introduce beam management enhancements.

SUMMARY

In general, example embodiments of the present disclosure provide methods, devices and computer storage media for beam management enhancements.

In a first aspect, there is provided a method performed by a terminal device. The method comprises: transmitting, to a network device, information related to a target transmission configuration indicator, TCI, state in a first set of TCI states for transmission between the terminal device and the network device, the first set of TCI states being at least partially non-overlapping with a second set of TCI states which have been activated, the target TCI state being outside the second set of TCI states; and setting at least the target TCI state in the first set of TCI states as activated.

In a second aspect, there is provided a method performed by a network device. The method comprises: receiving, from a terminal device, information related to a target transmission configuration indicator, TCI, state belonging to a first set of TCI states for transmission between the terminal device and the network device, the first set of TCI states being at least partially non-overlapping with a second set of TCI states which have been activated, the target TCI state being outside the second set of TCI states; and performing communication with the terminal device based on at least the first set of TCI states.

In a third aspect, there is provided a method performed by a terminal device. The method comprises: receiving, from a network device, information related to a target transmission configuration indicator, TCI, state in a first set of TCI states for transmission between the terminal device and the network device, the first set of TCI states being at least partially non-overlapping with a second set of TCI states which have been activated; and setting at least the target TCI state in the first set of TCI states as activated.

In a fourth aspect, there is provided a method performed by a network device. The method comprises: transmitting, to a terminal device, information related to a target transmission configuration indicator, TCI, state belonging to a first set of TCI states for transmission between the terminal device and the network device, the first set of TCI states being at least partially non-overlapping with a second set of TCI states which have been activated; and performing communication with the terminal device based on at least the first set of TCI states.

In a fifth aspect, there is provided a method performed by a terminal device. The method comprises: monitoring beam failure detection, BFD, reference signal, RS, related to a first TCI state in a set of TCI states, wherein a channel with the first TCI state is being monitored by the terminal device; and monitoring candidate beam detection, CBD, RS related to each TCI state in the set of TCI states other than the first TCI state.

In a sixth aspect, there is provided a method performed by a terminal device. The method comprises: receiving, from a network device, an indication of beam failure detection, BFD, interruption; stopping increasing a counter of beam failure instance, BFI; and resuming the counter of BFI after the BFD interruption.

In a seventh aspect, there is provided a method performed by a network device. The method comprises: transmitting, to a terminal device, an indication of beam failure detection, BFD, interruption.

In an eighth aspect, there is provided a terminal device. The terminal device comprises a processor and a memory. The memory is coupled to the processor and stores instructions thereon. The instructions, when executed by the processor, cause the terminal device to perform the method according to any aspect of the first, the third, the fifth and the sixth aspects of the present disclosure, or the.

In a ninth aspect, there is provided a network device. The network device comprises a processor and a memory. The memory is coupled to the processor and stores instructions thereon. The instructions, when executed by the processor, cause the network device to perform the method according to any aspect of the second, the fourth and the seventh aspects of the present disclosure.

In a tenth aspect, there is provided a computer readable medium having instructions stored thereon. The instructions, when executed on at least one processor, cause the at least one processor to perform the method according to any aspect of the first, second, third, fourth, fifth, sixth and seventh aspects of the present disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
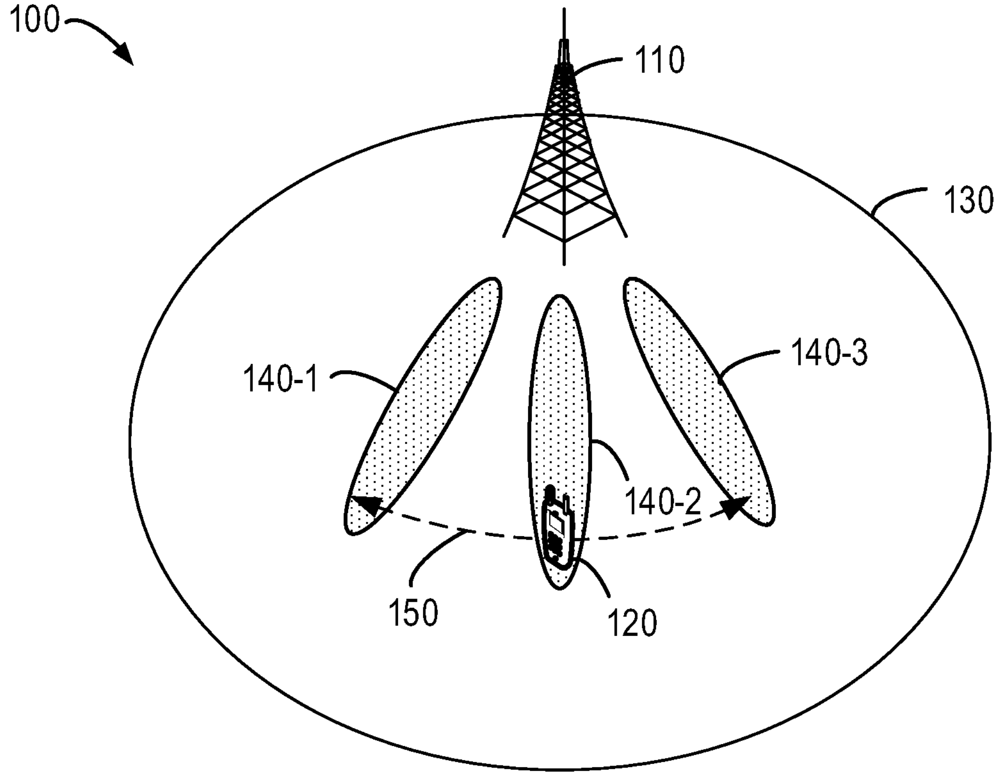
FIG. 1 illustrate an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory (memories) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

In the following, the terms "transmission", "transmission occasion" and "repetition" can be used interchangeably. The terms "precoder", "precoding", "precoding matrix", "beam", "spatial relation information", "spatial domain transmission filter", "spatial domain filter", "spatial parameter", "spatial relation information", "spatial relation info", "TPMI", "precoding information", "precoding information and number of layers", "precoding matrix indicator (PMI)", "precoding matrix indicator", "transmission precoding matrix indication", "precoding matrix indication", "TCI state", "transmission configuration indicator", "quasi co-location (QCL)", "quasi-co-location", "QCL parameter" and "spatial relation" can be used interchangeably. The terms "SRI", "SRS resource set index", "UL TCI", "UL spatial domain filter", "UL beam", "joint TCI" can be used interchangeably. The terms "beam" and "link" can be used interchangeably.

In one embodiment, a terminal device may communicate with a terminal device in a communication network. Information related with configuration for the terminal device may be transmitted from the network device in the communication network or pre-configured. The information may be transmitted via any of the following: Radio Resource Control (RRC) signaling, Medium Access Control (MAC) control element (CE), Downlink Control Information (DCI) or pre-configuration.

FIG. 1 shows an example communication network 100 in which embodiments of the present disclosure can be implemented. The network 100 includes a network device 110 and a terminal device 120 served by the network device 110. The network 100 may provide at least one serving cell 130 to serve the terminal device 120. It is to be understood that the number of network devices, terminal devices and serving cells is only for the purpose of illustration without suggesting any limitations. The network 100 may include any suitable number of network devices, terminal devices and serving cells adapted for implementing embodiments of the present disclosure. It is to be noted that the term "cell", "serving cell", "carrier component (CC)" and "bandwidth part (BWP)" can be used interchangeably herein.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link. DL comprises one or more logical channels, including but not limited to a physical downlink control channel (PDCCH), a physical downlink shared channel (PDSCH) and physical broadcast channel (PBCH). UL comprises one or more logical channels, including but not limited to a physical uplink control channel (PUCCH), a physical uplink shared channel (PUSCH) and physical random access channel (PRACH).

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G), 5G-advanced communication protocols.

In embodiments, the network device 110 is configured to implement beamforming technique and transmit signals to the terminal device 120 via a plurality of beams. The terminal device 120 is configured to receive the signals transmitted by the network device 110 via the plurality of beams. There may be different beams for transmissions between the terminal device 120 and the network device 110. As shown in FIG. 1, DL beams 140-1, 140-2 and 140-3 are configured for transmissions. For ease of discussion, DL beams 140-1, 140-2 and 140-3 are collectively or individually referred to as DL beams 140 or beams 140. It is to be understood that the number of beams is only for the purpose of illustration without suggesting any limitations.

As mentioned above, beam management has been used to enhance transmissions between the terminal device and the network device. The beam management usually comprises beam indication, beam failure detection (BFD), candidate beam detection (CBD) and beam failure recovery (BFR), etc. To better understand the principle and example embodiments of the present disclosure, a brief introduction to the beam indication is now described below. The BFD, CBD and BFR will be described later.

The beam indication is usually used for the network device to provide beam information to the terminal device about which beam to user for transmission. Conventionally, for DL, transmission configuration indicator (TCI) state based beam indication is used. For UL, the beam indication is based on "spatial relation". It has been proposed to use UL TCI or joint TCI for both DL and UL.

It has also been proposed to adopt "QCL" concept. For example, two antenna ports are "QCLed" or "QCL'd" with respect to spatial receive (Rx) parameters means the transmissions from these two antenna ports should share the same Rx beam from the terminal device perspective. QCL relationship between the demodulation reference signal (DM-RS) ports of the PDSCH and the CSI-RS port(s) of a CSI-RS resource represents that the PDSCH using the same beam as a CSI-RS.

The TCI states may be configured by the network device. For example, a list of TCI states may be configured per CC, per BWP or per CC group. The TCI state configuration may be transmitted to the terminal device via RRC. The TCI state configuration may contain corresponding identifier (ID), QCL type and corresponding reference signal (RS). As an example, the QCL properties may be e.g. delay spread, average delay, Doppler spread, Doppler shift, spatial reception (RX). QCL type A means Doppler spread, Doppler shift, delay spread, and/or average delay, and QCL type D means spatial RX. Currently, QCL types are defined as following:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, a TCI state signaling and a QCL information signaling may be illustrated as below:

```
TCI-State ::=      SEQUENCE {
  tci-StateId          TCI-StateId,
  qcl-Type1            QCL-Info,
  qcl-Type2            QCL-Info              OPTIONAL,
  ...
}
QCL-Info ::=       SEQUENCE {
```

-continued

```
    cell            ServCellIndex           OPTIONAL,
    bwp-Id          BWP-Id                  OPTIONAL,
    referenceSignal CHOICE {
      csi-rs            NZP-CSI-RS-ResourceId,
      ssb               SSB-Index
    },
    qcl-Type          ENUMERATED {typeA, typeB, typeC, typeD},
    ...
}
```

After the TCI configuration, the terminal device uses MAC CE to activate a subset of TCI states for the terminal device. For example, MAC CE may activate s subset of TCI states configured by Radio Resource Control (RRC). Alternatively, MAC CE may indicates a TCI state configured by RRC. MAC CE activation may be used for PDSCH TCI states. MAC CE activation may be also used to map TCI state identifier to codepoint of TCI field in Downlink Control Information (DCI). TCI field in DCI may indicate TCI state(s) for PDSCH from activated subset of TCI states. If TCI field is not present in DCI, PDSCH beam follows PDCCH.

As used hereinafter, the term “activation” means that for corresponding activated TCI states, the terminal device is required to tune its Rx parameters including Rx beams, time/frequency synchronization, etc., to be prepared to use this TCI state for receiving immediately if it is indicated TCI field DCI. As used hereinafter, the term “track” means that more power and complexity than simply measuring reference signal received power (RSRP) or signal to interference plus noise ratio (SINR).

As used hereinafter, a TCI state may be referred to “a known TCI state” if the TCI state is a activated TCI state. In addition, a TCI state may be referred to “a known TCI state” if the terminal device has transmitted the information about it. A TCI state may be referred to as “an unknown TCI state” if the TCI state is an inactive TCI state.

When a terminal device receives a DCI indicating an activated TCI state at slot n, the terminal device may be able to transmit or receive PDSCH/PDCCH/CSI-RS/PUSCH/PUCCH/SRS with the TCI state of the serving cell or the serving cell group on which TCI state switch occurs at the first slot that is after slot n+T1, where, T1 at least includes the time required by the terminal device to perform PDCCH reception and applying spatial parameters.

When a terminal device receives a DCI indicating an inactive TCI state at slot n, the terminal device may be able to transmit or receive PDSCH/PDCCH/CSI-RS/PUSCH/PUCCH/SRS with the TCI state of the serving cell or the serving cell group on which TCI state switch occurs at the first slot that is after slot n+T2, where, T2 at least includes the time required by the terminal device to perform PDCCH reception, set the TCI state as activated and applying spatial parameters.

However, for a moving terminal device, such as a terminal device on a high-speed train, frequent MAC CE activation is required. Such frequent MAC CE activation will result in latency and signaling overhead, which will impact the performance of transmission.

It has been proposed to indicate plurality of TCI states for sequential transmission beams for the terminal device. It has also been proposed to associate beam with time slot to enhance a sequence of applied beam. However, these approaches fail to provide protection or confirmation from the terminal device which may vary its speed or location. Thus, it will lead the pre-set beam pattern less useful.

As discussed above, it is very challenging to enhance the beam management especially the beam indication. According to embodiments of the present disclosure, there is proposed a solution for beam management enhancement to deal with any of the above mentioned problems. The terminal device transmits, to the network device, information related to a target TCI state if the target TCI state is outside the second set of TCI states which has been activated. Then, the terminal device sets at least the target TCI state in a first set of TCI states as activated, the first set of TCI states being at least partially non-overlapping with the second set of TCI states. By setting at least the target TCI state as activated by the terminal device, the MAC CE activation from the network device is not required, thus reduces the latency and signaling overhead.

Above has described the beam indication, from now on, information related to BFD, CBD and BFR will be discussed. Generally, the terminal device performs BFD to detect when one or more physical downlink control channels (PDCCH) links are considered to be in failure conditions. When the terminal device detects a beam failure, the terminal device will perform CBD to detect a new potential beam called candidate beam. The terminal device may also perform BFR to recover the beam failure.

In the present disclosure, several methods to improve the BFD, CBD and BFR have also been proposed which will be described in details later.

To better understand the solution for beam management enhancement, some embodiments are now described with reference to FIGS. 2-15.

Beam Indication Enhancements

Figure 2:
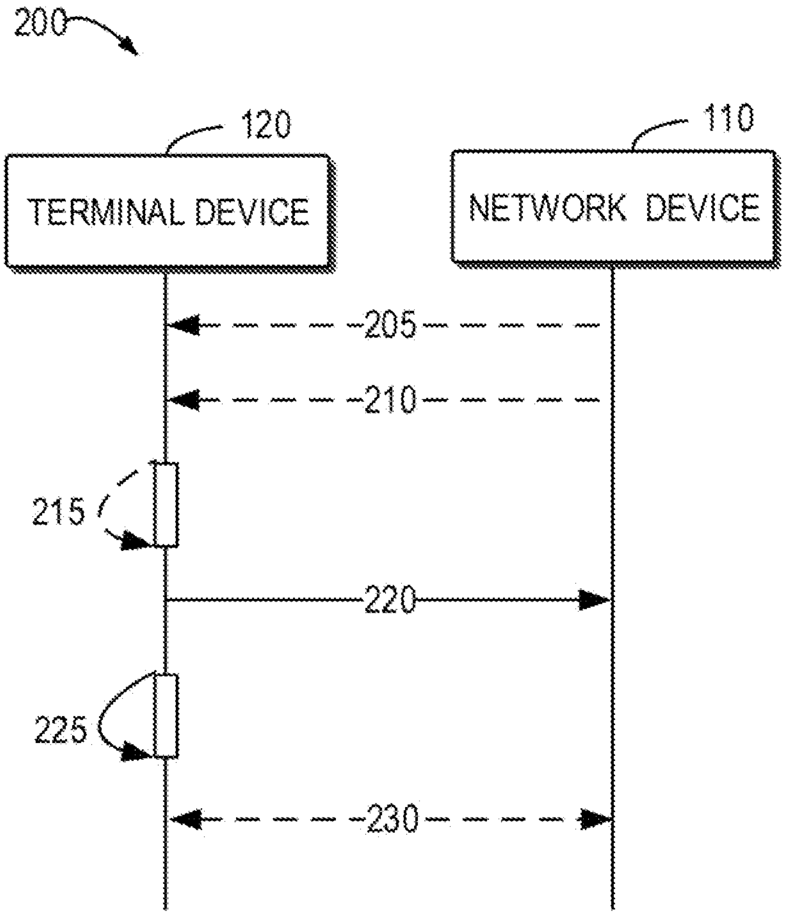
FIG. 2 illustrates a signaling flow for communication according to some example embodiments of the present disclosure.

FIG. 2 illustrates a signaling flow 200 for communication according to some example embodiments of the present disclosure. As shown in FIG. 2, the signaling flow 200 involves the terminal device 120 and the network device 110 as illustrated in FIG. 1. For the purpose of discussion, there are one terminal device and one network device illustrated in FIG. 2. It is to be understood that the signaling flow 200 may involves more terminal devices, or more network devices, and the number of terminal devices or network devices illustrated in FIG. 2 is only for the purpose of illustration without suggesting any limitations.

In operation, the network device 110 may transmit 205 a TCI state set configuration to the terminal device 120. For example, the TCI state set configuration may be transmitted via any of RRC, MAC CE, DCI or pre-configured. The TCI state set configuration may indicate at least the first set of TCI states and the second set of TCI states. In addition, in some example embodiments, the terminal device 120 may transmit an acknowledgement to the network device 120 indicating that the TCI state set configuration is completed.

Figure 3:
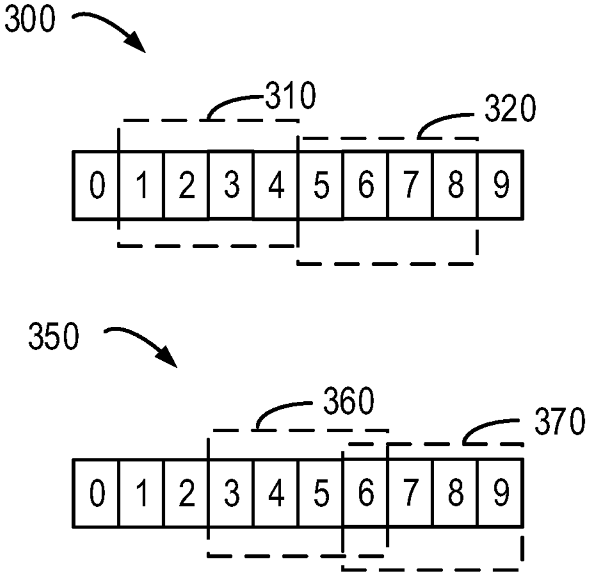
FIG. 3 illustrates some example sets of TCI states according to some example embodiments of the present disclosure.

FIG. 3 shows several example TCI states sets according to the present disclosure. As shown in FIG. 3, TCI states sets 300 comprises a set 310 of TCI states and a set 320 of TCI states. The set 310 of TCI states comprises TCI states with identifiers 1, 2, 3 and 4 as illustrated, while the set 320 of TCI states comprises TCI states with identifiers 5, 6, 7 and 8 as illustrated. In TCI states sets 300, the set 310 of TCI states and the set 320 of TCI states are non-overlapping. It is to be understood that the TCI states sets 300 may comprise more sets of TCI states other than the set 310 of TCI states and the set 320 of TCI states. In TCI states sets 300, all of the TCI states may be grouped into non-overlapping sets of TCI states.

As shown in FIG. 3, TCI states sets 350 comprises a set 360 of TCI states and a set 370 of TCI states. The set 360 of TCI states comprises TCI states with identifiers 4, 3, 5 and 6 as illustrated, while the set 370 of TCI states comprises TCI states with identifiers 7, 6, 8 and 9 as illustrated. In TCI states sets 350, the set 360 of TCI states and the set 370 of TCI states are partially non-overlapping. The TCI state with an identifier 4 is associated with the set 360 of TCI states, while the TCI state with identifier 7 is associated with the set 370 of TCI states. For each TCI state in the TCI states sets 350, a respective set of TCI states may be configured by the network device 110. For a TCI state with an identifier 4, an associated set 360 of TCI states may comprise TCI states with identifiers 4, 3, 5 and 6 as illustrated in FIG. 3, while for a TCI state with identifier 7, an associated set 370 of TCI states may comprise TCI states with identifiers 7, 6, 8 and 9. It is to be understood that set 360 and set 370 of TCI states are only for illustration, the TCI states sets 350 may comprise more sets of TCI states other than the set 360 of TCI states and the set 370 of TCI states.

The examples of TCI states sets 300 and TCI states sets 350 are only illustrated are described only for the purpose of illustration, without suggesting any limitation as to the scope of the disclosure. The TCI states sets may be configured by using other suitable rules.

Figure 4:
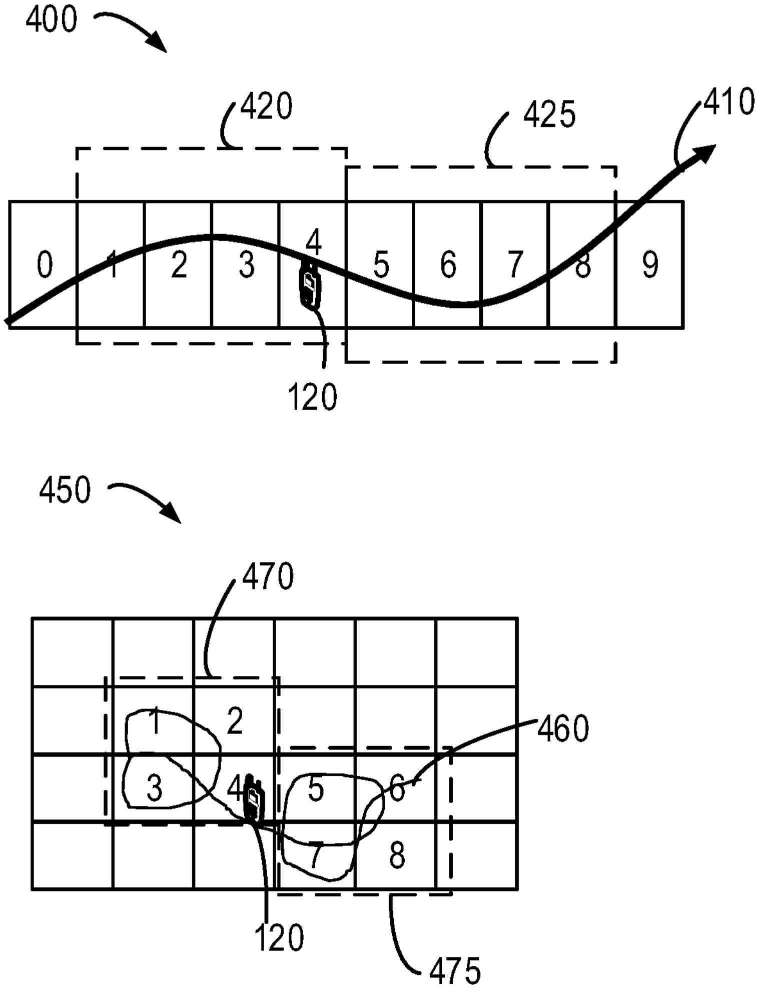
FIG. 4 illustrates some example sets of TCI states configured based on position according to some example embodiments of the present disclosure.

In some example embodiments, the TCI states sets may be configured by the network device 110 based on any of the following: position, prediction, or other pre-configured rules. For example, the network device 110 may configure the TCI states sets based on TCI state-position association. FIG. 4 shows several TCI states sets configured based on position. In TCI states sets 400, the terminal device 120 is moving along the trajectory 410, for example, the terminal device 120 is on the highway or railway. The TCI states sets 400 may be configured based on the trajectory 410. As illustrated, the set 420 of TCI states comprises TCI states with identifiers 1, 2, 3 and 4, while the set 425 of TCI states comprises TCI states with identifiers 5, 6, 7 and 8. As shown in FIG. 4, the terminal device 120 is located at a location associated with the TCI state with identifier 4 in the set 420 of TCI states and will move to a location associated with the TCI state with identifier 5 in the set 425 of TCI states. For example, the terminal device 120 is located in a coverage area of a beam corresponding to the TCI state with identifier 4 and will move to a location in a coverage area of a beam corresponding to the TCI state with 5.

In TCI states sets 450, the terminal device 120 is moving along the trajectory 460. The TCI states sets 400 may be configured based on the trajectory 410. As illustrated, the set 470 of TCI states comprises TCI states with identifiers 1, 2, 3 and 4, while the set 475 of TCI states comprises TCI states with identifiers 5, 6, 7 and 8. As shown in FIG. 4, the terminal device 120 is located at a location associated with the TCI state with identifier 4 in the set 470 of TCI states and will move to a location associated with the TCI state with identifier 5 in the set 475 of TCI states. It is to be understood that these examples of TCI states sets are described only for the purpose of illustration, without suggesting any limitation as to the scope of the disclosure.

In some example embodiments, the TCI states sets may be configured by the network device 110 based on prediction. For example, the network device may configure the TCI states sets based on TCI state transition probability. TCI state transition probability may be calculated by statistics or reports (such as historical data) collected from other terminal devices. If current TCI state is with identifier "x" at time point t, the transition probability represents the probability of a terminal device to be served by TCI state with identifier "y" with time duration t+T, wherein T is a time duration determined by the network device 110, or reported by the terminal device 120, or pre-configured or pre-defined. Table 1 below shows transition probability of TCI state with identifier 4. It is to be understood that although Table 1 only shows transition probability of TCI state with identifier 4, Table 1 may further comprise transition probability of other TCI states.

TABLE 1

| Transition probability of TCI state with identifier 4 | | | | | | | | | | |
|---|---|---|---|---|---|---|---|---|---|---|
| | 0 | 1 | 2 | 3 | 4 | 5 | 6 | 7 | 8 | 9 |
| 0 | ... | ... | ... | ... | ... | ... | ... | ... | ... | ... |
| 1 | ... | ... | ... | ... | 0.10 | ... | ... | ... | ... | ... |
| 2 | ... | ... | ... | ... | 0.20 | ... | ... | ... | ... | ... |
| 3 | ... | ... | ... | ... | 0.20 | ... | ... | ... | ... | ... |
| 4 | ... | ... | ... | ... | 0.40 | ... | ... | ... | ... | ... |
| 5 | ... | ... | ... | ... | 0.05 | ... | ... | ... | ... | ... |
| 6 | ... | ... | ... | ... | 0.05 | ... | ... | ... | ... | ... |
| 7 | ... | ... | ... | ... | 0.00 | ... | ... | ... | ... | ... |
| 8 | ... | ... | ... | ... | 0.00 | ... | ... | ... | ... | ... |
| 9 | ... | ... | ... | ... | ... | ... | ... | ... | ... | ... |

The network device 110 may configure the TCI states sets based on the transition probability as shown in Table 1. For example, in the TCI states sets 300 as illustrated in FIG. 3, two TCI states in a same set of TCI states have a higher transition probability, for example, the transition probability of TCI state with an identifier 4 to TCI state with identifiers 1, 2, 3 and 4 is relatively high (0.10, 0.20, 0.30 and 0.40 as shown in Table 1) while two TCI states from different sets of TCI states have a lower transition probability, for example, the transition probability of TCI state with an identifier 4 to TCI states with identifiers 5, 6, 7 or 8 is relatively low (0.05, 0.05, 0.00 and 0.00 as shown in Table 1).

For another example, TCI states with higher transition probabilities may be configured in a set of TCI states, TCI states with lower transition probability may be configured in another set of TCI states. The network device 110 may also set a threshold probability such as 0.10, the TCI states with transition probabilities higher than the probability threshold (i.e., TCI states with identifiers 1, 2, 3 and 4) may be configured in a set of TCI states, and the TCI states with transition probabilities lower than the probability threshold (i.e., TCI states with identifiers 5, 6, 7 and 8) may be configured in another set of TCI states. The threshold probability may be determined by the network device 110, or reported by the terminal device 120, or pre-configured or pre-defined.

For example, in the TCI states sets 350, each TCI states associated with a set of TCI states have a probability higher than a probability threshold. In some example embodiments, the network device 110 may transmit, to the terminal device 120, information related to the transition probability of a TCI state to each TCI state in an associated set of TCI states. For example, the network device 110 may transmit, to the terminal device 120, the transition probability of a TCI state to each TCI state in an associated set of TCI states. Alternatively, the network device 110 may rank TCI states in an associated set of TCI states in the ascending/descending order of transition probability. Then the network device 110 may transmit information related to the set of TCI states in the ascending/descending order. Thus, the terminal device 120 will be informed with transition probability information of each TCI state in the set of TCI states.

As discusses above, the TCI states sets may be configured by the network device 110 based on position or prediction.

In addition or alternatively, the TCI states sets may be configured by the network device 110 based on some configured or preconfigured rules, which will be discussed in detail later. In the case that the TCI states sets may be configured based on pre-defined or pre-configured rules. The network device 110 may further transmit an indication concerning a rule of TCI states set configuration to the terminal device 120.

Reference is now made back to FIG. 2. The network device 110 may transmit 210 DL reference signal (RS) to the terminal device 120. Alternatively, the terminal device 120 may perform DL RS measurement. For example, the DL RS may comprise RS for the terminal device 120 to track current TCI states and RS for the terminal device 120 to report new TCI states. In some example embodiments, RS may include the one configured via referenceSignal, such as with QCL Type D. Alternatively, RS may be other RS associated with or Type D QCLed with the one configured via referenceSignal. In some example embodiments, DL RS transmission or measurement may be performed periodically.

In some example embodiments, the terminal device 120 may only measure RS related to the first tier neighbors of current TCI state. In the example of TCI states sets 350 and when the current TCI state is the TCI state with an identifier 4, the terminal device 120 may only measure RS related to TCI states in the set 360 of TCI states, i.e., for TCI states with identifiers 4, 3, 5 and 6.

The terminal device 120 may perform 215 the TCI state determination. For example, the terminal device 120 may track all TCI states in the set containing current TCI state. For example, in the case that the current TCI state is the TCI state with identifier 4, the set containing current TCI state may be the set 310 of TCI states as shown in FIG. 3. In this case, the terminal device 120 may track TCI states with identifiers 1, 2, 3 and 4. All TCI states in the set 310 of TCI states may be set as activated. TCI states to TCI codepoint in DCI mapping may be automatically updated in Table 2 below.

TABLE 2

TCI states to TCI codepoint in DCI mapping

| TCI codepoint in DCI (fix 3-bit) | TCI codepoint in DCI (variable bitwidth) | TCI state identifier if current TCI state set identifier is 1 | TCI state identifier if current TCI state set identifier is 2 |
|---|---|---|---|
| 000 | 00 | TCI state identifier 1 | TCI state identifier 5 |
| 001 | 01 | TCI state identifier 2 | TCI state identifier 6 |
| 010 | 10 | TCI state identifier 3 | TCI state identifier 7 |
| 011 | 11 | TCI state identifier 4 | TCI state identifier 8 |
| . . . | . . . | . . . | . . . |

As shown in Table 2, TCI filed in DCI may be fixed as 3 bits, then mapping may be ordered by TCI state identifier (ID) (e.g., lowest ID first). Alternatively, TCI field in DCI may be ordered by the ascending/descending order of transition probability of each TCI state. TCI field bitwidth in DCI may depend on TCI state set size N, e.g., ceil(log 2(N)) where ceil( ) represents a ceiling function. TCI states in corresponding TCI state set may be automatically mapped to TCI codepoint in DCI with some aligned rule between the terminal device 120 and the network device 110. The network device 120 may use legacy TCI field in DCI to inform the terminal device 120 the applied TCI state within current TCI state set.

In some example embodiments, since all TCI state in the set is activated, no need for further tuning, application timing may follow legacy definition for DCI based TCI state switch. Initially, let 'current TCI state'='initial TCI state', 'initial TCI state' may be defined by the default behavior or be signaled by legacy method. By doing so, no MAC CE activation is needed, thus reduce latency and signaling overhead.

The terminal device 120 transmits 220 to the network device 110, information related to a target TCI state in a first set of TCI states for transmission between the terminal device 120 and the network device 110. The first set of TCI states is at least partially non-overlapping with a second set of TCI states which have been activated. The target TCI state is outside the second set of TCI states. For example, in the case that the second set of TCI states which have been activated is the set 310 of TCI states as shown in FIG. 3, the target TCI state with identifier 5 is outside the set 310 of TCI states and in the set 320 of TCI states. The terminal device 120 may transmit to the network device information related to the target TCI set with identifier 5 in the set 320 of TCI states. It is to be understood that in some embodiments, the terminal device 120 may transmit information related to several target TCI states in a first set of TCI states for transmission.

In some example embodiments, the terminal device 120 may transmit the information related to the target TCI state if at least one of the following conditions is met: a first channel quality associated with the target TCI state is higher than a threshold quality, the first channel quality is higher than a second channel quality associated with a current TCI state in the second set of TCI states, wherein a channel with the current TCI state is being monitored by the terminal device, the first channel quality is higher than the second channel quality with an offset, and the first channel quality is higher than the second channel quality with an offset for a plurality of times. Examples of channel quality may include but not limited to reference signal received power (RSRP), reference signal receiving quality (RSRQ) or signal to interference plus noise ratio (SINR).

In some example embodiments, the terminal device 120 may transmit the information related to the target TCI state on a reporting resource on at least one of: physical uplink control channel (PUCCH), physical uplink shared channel (PUSCH) or physical random access channel (PRACH). In addition or alternatively, the reporting resource may be multiplexed with a resource for beam report, CSI report or beam failure recovery request, BFRQ. Alternatively, the reporting resource may be a dedicated resource reserved for the terminal device to transmit the information related to the target TCI state.

In some example embodiments, the terminal device 120 may transmit synchronization signals/physical broadcast channel block resource indicator (SSBRI) or channel state information reference signal (CSI-RS) resource indicator (CRI) related to the target TCI state. Alternatively, the terminal device 120 may transmit SSBRI or CRI related to the target TCI state with an indication for beam switching. Alternatively or additionally, the terminal device 120 may transmit SSBRI or CRI related to the target TCI state with an indication for TCI state activation. Alternatively, the terminal device 120 may transmit information about the first set of TCI states. For example, the information about the first set of TCI states may comprise identifier of the first set of TCI states, and/or identifiers of the states in the first set of TCI states.

In some example embodiments, the terminal device 120 may transmit the information related to the target TCI state to trigger at least one of: channel acquisition procedure or fine-tuning procedure. As used hereinafter, the term "fine-tuning" may represent that the terminal device measures or obtains or calculates time or frequency or spatial or power domain parameters related to a target TCI state. More specifically, the time or frequency or spatial or power domain parameters may include average delay, delay speed, Doppler shift, Doppler spread, average gain, spatial domain Rx, etc. For example, the channel acquisition procedure may comprise one of the following: sounding reference signal (SRS) associated with terminal device report for the channel acquisition, or CSI report associated with terminal device report for the channel acquisition. The fine-tuning procedure may comprise tracking reference signal (TRS) transmission for fine-tuning. In some example embodiments, time/frequency/spatial-domain resources of SRS, CSI report, TRS, are associated with the information. In addition, for the terminal device 120, spatial domain transmission filter and transmitting power for SRS transmission is related to the target TCI state. For the network device 110, spatial domain transmission filter for CSI resources for the CSI report is related to the target TCI state. For the terminal device 120, QCL type D reference signal for CSI resources for the CSI report is related to the target TCI state. For example, the TRS transmission and CSI report may be aperiodic or alternatively repeated or semi-periodic.

After the terminal device 120 transmits 220 the information related to the target TCI state, the terminal device 120 sets 225 at least the target TCI state in the first set of TCI states as activated. For example, the terminal device 120 may set the target TCI state in the first set of TCI states as activated. The terminal device 120 may also update a mapping relationship between TCI state identifier and TCI codepoint in DCI with an identifier of the target TCI state.

In addition or alternatively, the terminal device 120 may set each TCI state in the first set of TCI states as activated. The terminal device 120 may further update a mapping relationship between TCI state identifier and TCI codepoint in DCI with an identifier of each TCI state in the first set of TCI states. For example, after a time duration X, some or all TCI states in the first set of TCI states may be set as activated. The time duration X may be equal to 0 or other suitable time duration. The time duration X for each TCI states in the first set of TCI states may be different.

For example, an updated mapping relationship between TCI state identifier and TCI codepoint in DCI will be illustrated in Table 3 as below.

TABLE 3 updated TCI states to TCI codepoint in DCI mapping

| TCI codepoint in DCI | TCI state identifier |
|---|---|
| 000 | 5 |
| 001 | 6 |
| 010 | 7 |
| 011 | 8 |
| . . . | |
| 111 (reserved) | 4 (latest TCI state from other TCI state set) |

In Table 3, TCI codepoint in DCI may be in fixed bit or with variable bitwidth similar to Table 2. Table 3 also shows a reserved TCI codepoint in DCI (i.e., 111) which will be described later.

In addition or alternatively, the terminal device 120 may set at least one TCI state in the second set of TCI states as inactive. For example, in the example that the target TCI state is the TCI state with an identifier 5 and the second set of TCI states is the set 310 of TCI states shown in FIG. 3, after a time duration Y, some TCI states or all TCI states in the set 310 of TCI states may be set as inactive. The time duration Y may be equal to 0 or other suitable time duration. The time duration Y for each TCI states in the second set of TCI states may be different. It is to be understood that the time durations X and Y may be configured or pre-configured by the network device 110, or reported by the terminal device 120, or pre-configured or pre-defined. The time duration Y may be greater than or equal to the time duration X. If the time duration Y is greater than the time duration X, the terminal device 120 may set two sets of TCI states as activated during time duration Y-X. The time durations X and Y may be counted since the terminal device 120 transmits 220 information related to the target TCI state to the network device. The time durations X and Y may be counted when the terminal device 120 receives a confirmation from the network device indicating that the information related to the target TCI state is received by the network device. Alternatively, the time durations X and Y may be counted from the completion of the channel acquisition procedure and/or the fine-tuning procedure. For example, the time durations X and Y may be counted from the completion of SRS, completion of transmission of CSI report or completion of transmission of TRS.

Additionally, the terminal device report may be confirmed by the network device 110 to ensure the correct reception of PRACH/PUCCH/PUSCH. If the transmission is carried via PUSCH, legacy method for ACKing PUSCH may be reused, for example, DCI carrying the same HARQ process ID and a toggled new data indicator (NDI). If the transmission is carried via PUCCH/PRACH, dedicated PDCCH/RNTI may be considered, for example, dedicated control resource set (CORESET)/search space/radio network temporary identifier (RNTI) may be configured for receiving the confirmation.

In some example embodiments, the terminal device 120 may monitor a PDCCH with the target TCI state. For example, the terminal device 120 may monitor a PDCCH with the target TCI state with an identifier 5. In addition, a reserved state with a reserved TCI codepoint such as TCI codepoint 111 may be mapped to a latest TCI state such as TCI state with an identifier 4 in the DCI mapping. In this case, the network device 110 may transmit an indication concerning to reject monitoring the target TCI state and to switch back to monitor the latest TCI state. For example, the indication concerning to reject monitoring the target TCI state may comprise the reserved TCI codepoint in the DCI.

In addition or alternatively, the terminal device 120 may monitor PDCCH with the latest TCI state, for example the TCI state with an identifier 4. In this case, the TCI state with an identifier 4 may not be set as inactive. Then, the terminal device 120 may receive from the network device 110, a confirmation that the target TCI state such as the TCI state with an identifier 5 will be used for a future transmission. In this case, a reserved state with a reserved TCI codepoint such as TCI codepoint 111 may be to the target state such as TCI state with an identifier 5 in the DCI mapping. The reserved state may be used for the network device 110 to confirm that new set of TCI states is activated. The terminal device 120 may further update a mapping relationship between TCI state identifier and TCI codepoint in DCI. In this case, the updated TCI states to TCI codepoint in DCI mapping will be illustrated in Table 4 as below. In this case, if the TCI state with an identifier 4 is activated, the timing to set the TCI state with an identifier 5 as activated may be for example a threshold time duration X1 based on the terminal device capability timeDurationForQCL. If the TCI state with an identifier 4 is inactive, and network device 110 transmits a confirmation that reserved TCI state such as the TCI state with an identifier 5 will be used for a future transmission, then the timing to set the TCI state with an identifier 5 as activated may be for example a threshold time duration X2 greater than or equal to X1. For example, X2 may be set by adding a time for activation delay to X1.

TABLE 4 updated TCI states to TCI codepoint in DCI mapping

| TCI codepoint in DCI | TCI state identifier |
|---|---|
| 000 | 1 |
| 001 | 2 |
| 010 | 3 |
| 011 | 4 |
| . . . | |
| 111 (reserved) | 5 (target TCI state reported by terminal device) |

In some example embodiments, after setting some or all TCI states in the first set of TCI states as activated, the terminal device 120 may monitor BFD RS related to a first TCI state in the first set of TCI states. A channel with the first TCI state is being monitored by the terminal device 120. The terminal device 120 may also monitor CBD RS related to each state in the first set of TCI states other than the first TCI state.

Before transmitting 220 the information related to the target TCI state, the terminal device 120 may monitor BFD RS related to a second TCI state in the second set of TCI states. A channel with the second TCI state is being monitored by the terminal device 120. The terminal device 120 may also monitor CBD RS related to each state in the second set of TCI states other than the second TCI state.

By doing so, the terminal device 120 do not need to measure all the configured DL RS for CBD, thus the terminal device 120 complexity and power consumption will be reduced. Details about the BFD and CBD according to the present disclosure will be described with respect to FIG. 7 later.

In some example embodiments, the terminal device 120 may transmit, to the network device 110, a notification about whether the terminal device 120 has the ability to support the process described above, and/or information about at least one of the following: maximum number of TCI states in one TCI state set, maximum number TCI state sets, information about the conditions to transmit the information related to the target TCI state, or information about UL resources. The above described process may be referred to as prediction based beam indication, or terminal device initiated/assisted beam indication. The network device 110 may switch between legacy beam indication method and the prediction based beam indication via dedicated and/or explicit signaling, for example, RRC information element (IE).

After setting at least the target TCI state as activated, beam measurement and/or reporting may be performed between the terminal device 120 and the network device 110. In some example embodiments, the TCI state reported is applied for PDCCH/PDSCH. For example, the TCI state reported may be only for PDSCH. Alternatively, the terminal device 120 may report information related to TCI state for specific channel/RS, e.g., TCI state with an identifier x for PDCCH and TCI state with an identifier y for PDSCH.

In some example embodiments, the network device 110 may configure to change to a new set of TCI states. The network device 110 may update within activated TCI states and transmit a DCI indication of TCI state to the terminal device 120. Then the terminal device 120 may apply the indicated TCI state. Alternatively, the network device 110 may need to re-configure TCI states sets. Then, the network device 110 may transmit the re-configured TCI states set configuration to the terminal device 120.

With this prediction based beam indication, MAC CE activation is not required, thus can reduce latency and signaling overhead. By doing so, the beam indication will be improved.

In some example embodiments, when the joint TCI may be applied to both DL and UL, the above mentioned beam indication process may be applied to UL as well. In addition, the terminal device 120 may maintain or obtain path loss for UL power control in the configured set of TCI states. Alternatively, without the joint TCI, the above mentioned beam indication process may be applied to UL. In this case, the terminal device 120 transmitting information related to a target TCI state may be used as "activation" of "spatial relation" or "UL TCI". In this case, MAC CE signaling may be needed. By doing so, the beam indication according to the present disclosure may be applied to both the DL and the UL, thus will reduce latency and signaling overhead.

Details about the prediction based beam indication have been discussed above with respect to FIGS. 2-4. Another example embodiment of beam indication according to the present disclosure will be described with respect to FIGS. 5-6 below.

Figure 5:
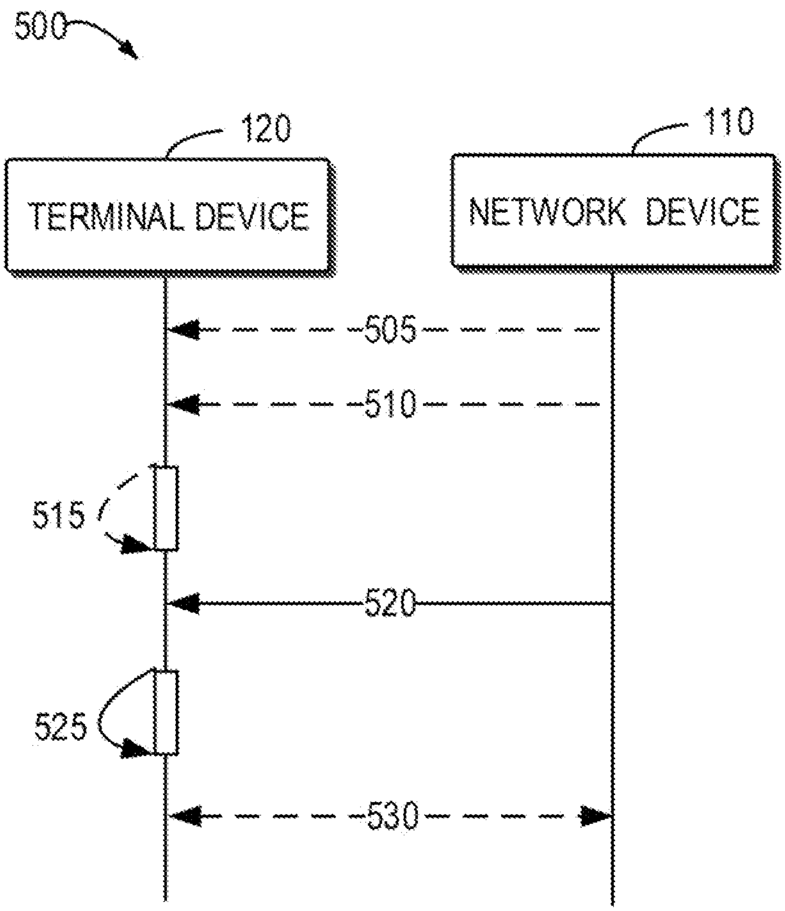
FIG. 5 illustrates another signaling flow for communication according to some example embodiments of the present disclosure.

FIG. 5 illustrates a signaling flow 500 for communication according to some example embodiments of the present disclosure. As shown in FIG. 5, the signaling flow 500 involves the terminal device 120 and the network device 110 as illustrated in FIG. 1. For the purpose of discussion, there are one terminal device and one network device illustrated in FIG. 5. It is to be understood that the signaling flow 500 may involves more terminal devices, or more network devices, and the number of terminal devices or network devices illustrated in FIG. 5 is only for the purpose of illustration without suggesting any limitations.

In operation, the network device 110 may transmit 505, to the terminal device 120, an indication concerning a rule of TCI state set configuration. For example, the TCI state set configuration and/or the indication concerning a rule of TCI state set configuration may be transmitted via any of RRC, MAC CE, DCI or pre-configured. The network device 110 may configure TCI states sets according to a sliding window or other suitable rules. The rules may be known by both the network device 110 and the terminal device 120. For example, the rule of TCI state set configuration may comprise information about a sliding window.

Figure 6:
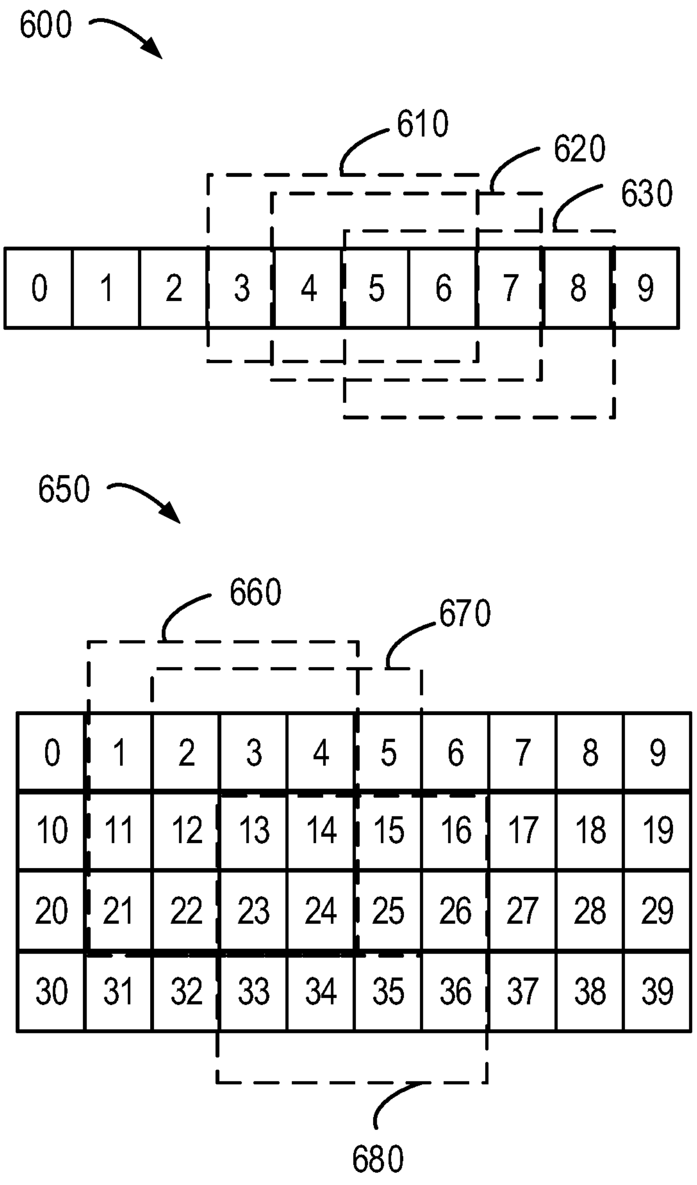
FIG. 6 illustrates some further example sets of TCI states according to some example embodiments of the present disclosure.

FIG. 6 shows several example sets of TCI states configured by a sliding window. As shown in FIG. 6, the TCI states sets 600 illustrate TCI states sets configured by a 1-dimension (1D) sliding window. The rule of a 1D sliding window may be as follows: for a TCI state with an identifier n, the TCI states with identifiers n−1, n, n+1 and n+2 may form a set of TCI states for the TCI state with the identifier n. As illustrated in FIG. 6, for the TCI state with an identifier 5, the set 620 of TCI states is formed with TCI states with identifiers 4, 5, 6 and 7. The set 610 and set 630 of TCI states are formed similarly.

FIG. 6 also illustrates an example of 2-dimension (2D) sliding window. In the TCI states sets 650, the set 660, the set 670 and the set 680 of TCI states are formed based on a configured or pre-configured 2D sliding window. It is to be understood that the network device 110 may use any suitable rules or sliding windows to configure the TCI states sets, the example TCI states sets 600 and 650 are only for the purpose of illustration without suggesting any limitations.

Reference is now made to FIG. 5. The network device 110 may transmit 510 DL reference signal (RS) to the terminal device 120. The terminal device 120 may perform DL RS measurements. For example, the DL RS may comprise RS for the terminal device 120 to track current TCI states and RS for the terminal device 120 to report new TCI states. In some example embodiments, RS may be the one configured via referenceSignal, such as with QCL Type D. Alternatively, RS may be other RS associated with or Type D QCLed with the one configured via referenceSignal. In some example embodiments, DL RS transmission or measurement may be performed periodically.

The terminal device 120 may perform 515 the TCI state determination. For example, the terminal device 120 may track all TCI states in the set containing current TCI state. For example, in the case that the current TCI state is the TCI state with identifier 4, the set containing current TCI state may be the set 610 of TCI states as shown in FIG. 6. In this case, the terminal device 120 may track TCI states with identifiers 3, 4, 5 and 6. All TCI states in the set 610 of TCI states may be set as activated. TCI states to TCI codepoint in DCI mapping may be automatically updated.

In some example embodiments, since all TCI state in the set is activated, no need for further tuning, application timing may follow legacy definition for DCI based TCI state switch. Initially, let 'current TCI state'='initial TCI state', initial TCI state' may be defined by the default behavior or be signaled by legacy method. By doing so, no MAC CE activation is needed, thus reduce latency and signaling overhead.

The network device 110 transmits 520, to the terminal device 120, information related to a target TCI state in a first set of TCI states for transmission between the terminal device 120 and the network device 110. The first set of TCI states is at least partially non-overlapping with a second set of TCI states which have been activated. For example, the network device 110 may transmit information related to the target TCI set with identifier 5 in the set 620 of TCI states. It is to be understood that in some embodiments, the network device 110 may transmit information related to several target TCI states in a first set of TCI states for transmission.

In some example embodiments, the network device 110 may transmit the TCI state identifier for the target TCI state to the terminal device 120. For example, the network device 110 may transmit the TCI state identifier for the target TCI state via DCI or via MAC CE.

After the network device 110 transmits 520 the information related to the target TCI state, the terminal device 120 sets 525 at least the target TCI state in the first set of TCI states as activated. For example, the terminal device 120 may set the target TCI state in the first set of TCI states as activated. The terminal device 120 may also update a mapping relationship between TCI state identifier and TCI codepoint in DCI with an identifier of the target TCI state.

In addition or alternatively, the terminal device 120 may set each TCI state in the first set of TCI states as activated. The terminal device 120 may further update a mapping relationship between TCI state identifier and TCI codepoint in DCI with an identifier of each TCI state in the first set of TCI states. For example, after a time duration X, some or all TCI states in the first set of TCI states may be set as activated. The time duration X may be equal to 0 or other suitable time duration. The time duration X for each TCI states in the first set of TCI states may be different. For example, in the example that the target TCI state is the TCI state with an identifier 5 and the second set of TCI states is the set 620 of TCI states shown in FIG. 6, after X time duration after the network device 110 transmitting information related to the target TCI states, TCI state with an identifier 7 will be set as activated.

In addition or alternatively, the terminal device 120 may set at least one TCI state in the second set of TCI states as inactive. For example, in the example that the target TCI state is the TCI state with an identifier 5 and the second set of TCI states is the set 610 of TCI states shown in FIG. 6, after a time duration Y, some TCI states or all TCI states for example TCI state with an identifier 3 in the set 610 of TCI states may be set as inactive. The time duration Y may be equal to 0 or other suitable time duration. The time duration Y for each TCI states in the second set of TCI states may be different. It is to be understood that the time durations X and Y may be configured or pre-configured by the network device 110, or reported by the terminal device 120, or pre-configured or pre-defined. The time duration Y may be greater than or equal to the time duration X. The time durations X and Y may be counted when the terminal device 120 receives an confirmation from the network device indicating that the information related to the target TCI state is received by the network device. Alternatively, the time durations X and Y may be counted from the completion of the channel acquisition procedure and/or the fine-tuning procedure.

In some example embodiments, the terminal device 120 may monitor a PDCCH with the target TCI state. For example, the terminal device 120 may monitor a PDCCH with the target TCI state with an identifier 5. In addition, a reserved TCI codepoint such as TCI codepoint 111 may be mapped to a latest TCI state such as TCI state with an identifier 4 in the DCI mapping. In this case, the network device 110 may transmit an indication concerning to reject monitoring the target TCI state and to switch back to monitor the latest TCI state.

In addition or alternatively, the terminal device 120 may receive from the network device 110, a confirmation that the target TCI state such as the TCI state with an identifier 5 will be used for a future transmission. In response to receiving the confirmation, the terminal device 120 may start to monitor a PDCCH with the target TCI state. In this case, a reserved TCI codepoint such as TCI codepoint 111 may be mapped to the target state such as TCI state with an identifier 5 in the DCI mapping. The reserved state may be used for the network device 110 to confirm that new set of TCI states is activated.

In some example embodiments, after setting some or all TCI states in the first set of TCI states as activated, the terminal device 120 may monitor BFD RS related to a first TCI state in the first set of TCI states. A channel with the first TCI state is being monitored by the terminal device 120. The terminal device 120 may also monitor CBD RS related to each state in the first set of TCI states other than the first TCI state.

Before receiving 520 the information related to the target TCI state, the terminal device 120 may monitor BFD RS related to a second TCI state in the second set of TCI states. A channel with the second TCI state is being monitored by the terminal device 120. The terminal device 120 may also monitor CBD RS related to each state in the second set of TCI states other than the second TCI state.

By doing so, the terminal device 120 do not need to measure all the configured DL RS for CBD, thus the terminal device 120 complexity and power consumption will be reduced. Details about the BFD and CBD according to the present disclosure will be described with respect to FIG. 7 later.

In some example embodiments, the terminal device 120 may transmit, to the network device 110, a notification about whether the terminal device 120 has the ability to support the process described above, and/or information about at least one of the following: maximum number of TCI states in one TCI state set, maximum number TCI state sets, information about the conditions to transmit the information related to the target TCI state, or information about UL resources. The above described process may be referred to as prediction based beam indication, or terminal device initiated/assisted beam indication. The network device 110 may switch between legacy beam indication method and the prediction based beam indication via dedicated and/or explicit signaling, for example, RRC information element (IE).

After setting at least the target TCI state as activated, beam measurement and/or reporting may be performed between the terminal device 120 and the network device 110. In some example embodiments, the TCI state reported is applied for PDCCH/PDSCH. For example, the TCI state reported may be only for PDSCH. Alternatively, the terminal device 120 may report information related to TCI state for specific channel/RS, e.g., TCI state with an identifier x for PDCCH and TCI state with an identifier y for PDSCH.

In some example embodiments, the network device 110 may configure to change to a new set of TCI states. The network device 110 may update within activated TCI states and transmit a DCI indication of TCI state to the terminal device 120. Then the terminal device 120 may apply the indicated TCI state. Alternatively, the network device 110 may need to re-configure TCI states sets. Then, the network device 110 may transmit the re-configured TCI states set configuration to the terminal device 120.

With this prediction based beam indication, MAC CE activation is not required, thus can reduce latency and signaling overhead. By doing so, the beam indication will be improved.

In some example embodiments, when the joint TCI may be applied to both DL and UL, the above mentioned beam indication process may be applied to UL as well. In addition, the terminal device 120 may maintain or obtain path loss for UL power control in the configured set of TCI states. Alternatively, without the joint TCI, the above mentioned beam indication process may be applied to UL. In this case, the terminal device 120 transmitting information related to a target TCI state may be used as "activation" of "spatial relation" or "UL TCI". In this case, MAC CE signaling may be needed. By doing so, the beam indication according to the present disclosure may be applied to both the DL and the UL, thus will reduce latency and signaling overhead.

Details about the prediction based beam indication have been discussed above with respect to FIGS. 2-6. From now on, enhancement on BFD and CBD will be described with respect to FIG. 7.

BFD and CBD Enhancements

A network device may configure a terminal device with a set of reference signals (RSs) for monitoring the quality of the link. This set of RSs may be referred as Q0 or beam failure detection RS (BFD-RS). Typically, BFD-RS(s) are configured to be spatially QCLed with PDCCH demodulation reference signal (DMRS). That is, these RSs correspond to downlink beams used for PDCCH. Downlink beams are identified by RS, either synchronization signal (SS)/physical broadcast channel (PBCH) block index (time location index) or channel state information-reference signal (CSI-RS) resource (set) index. The network device may configure the BFD-RS list using Radio Resource Control (RRC) signaling or with combined RRC and medium access control (MAC) control element (CE) signaling.

Physical layer assesses the quality of the radio link based on BFD-RS in set of Q0 periodically. Assessment is done per BFD-RS and when the radio link condition of each BFD-RS in the beam failure detection set is considered to be in failure condition, a beam failure instance (BFI) indication is provided to higher layer, for example, the MAC layer. Evaluation and indication may be done periodically.

MAC layer implements a counter to count the BFI indications from the physical layer and if the BFI counter reaches a maximum value (configured by the network device), a beam failure is declared. This counter can be configured to be supervised by a timer: each time MAC receives a BFI indication from lower layer a timer is started. Once the timer expires, the BFI counter is reset (counter value is set to zero).

The network device may provide the terminal device with a list of candidate RSs for recovery that can be indicated using a dedicated signal. Candidate beam L1-Reference Signal Receiving Power (RSRP) measurements may be provided to the MAC layer which performs the selection of new candidate beam and determines the uplink resources to indicate the new candidate beam to the network device. The network device may configure the terminal device with dedicated signaling resources, such as contention free random access (CFRA) resources, dedicated PUCCH, PUCCH-SR, PUSCH, which are specific to candidate beams, e.g., the terminal device can indicate new candidate beam by sending a preamble or by sending a channel contain information related to new candidate beam. The candidate RSs may comprise the SSB and/or CSI-RS.

Beam failure recovery procedure is initiated if the terminal device has declared a beam failure and/or the terminal device has detected a new candidate beam or beams based on L1 measurements (e.g., L1-RSRP). A dedicated signal can be configured (e.g. from the PRACH pool) for beam failure recovery purposes that can be used to indicate a candidate beam or in other words a beam identified by the downlink RS (reference signal, SSB or CSI-RS). This dedicated signal, can be referred to as BFR resource or CFRA resource, and it has to be noted that beam recovery procedure using CFRA signals differs slightly from Random Access (RA) procedure when it comes to gNB response to preamble reception. A dedicated preamble may be configured for each candidate RS in the Candidate-Beam-RS-List. A specific threshold may be configured so that if any of the new candidate beams (e.g., based on L1-RSRP measurements) are above the threshold, they can be indicated using the dedicated signal (set of resources in set Q1 or candidate beam list). The terminal device first selects a candidate beam from that set and in the case where there are no beams above the configured threshold, the terminal device utilizes contention based signaling to indicate the new candidate beam. Contention based random access (CBRA) preamble resources are mapped to specific downlink RS (SSB or CSI-RS).

The terminal device monitors the network response to BFRR (or BFRQ) during the beam recovery response window (similar to RAR window) using the same beam alignment (i.e. same beam direction that was used for transmission (TX) is used for RX) used for transmitting the recovery signal; it expects the network device to provide response using a beam that is spatially QCLed with the indicated downlink reference signal.

The present disclosure presents several approaches to improve the above mentioned BFD and CBD. Details about BFD and CBD enhancements will be described in details with respect to FIG. 7.

Figure 7:
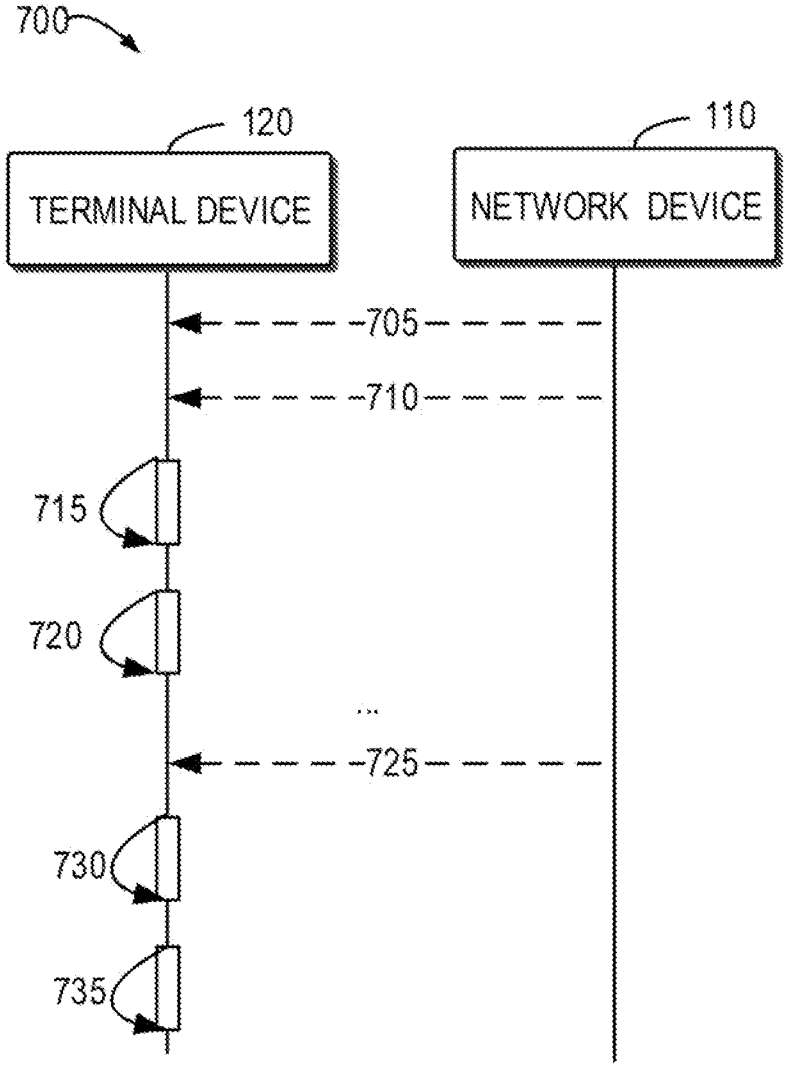
FIG. 7 illustrates another signaling flow for communication according to some example embodiments of the present disclosure.

Reference is now made to FIG. 7. FIG. 7 illustrates a signaling flow 700 for communication according to some example embodiments of the present disclosure. As shown in FIG. 7, the signaling flow 700 involves the terminal device 120 and the network device 110 as illustrated in FIG. 1. For the purpose of discussion, there are one terminal device and one network device illustrated in FIG. 7. It is to be understood that the signaling flow 700 may involves more terminal devices, or more network devices, and the number of terminal devices or network devices illustrated in FIG. 7 is only for the purpose of illustration without suggesting any limitations.

In operation, the network device 110 may transmit 705, to the terminal device 120, configuration for BFR via RRC or MAC CE or DCI. The configuration may indicate at least the set of TCI states which comprises a first TCI state. The network device 110 may transmit 710 DL RS for BFD and/or CBD for each link.

The terminal device 120 monitors 715 BFD RS, related to a first TCI state in a set of TCI states. A channel with the first TCI state is being monitored by the terminal device 120. The terminal device 120 monitors 720 CBD RS related to each TCI state in the set of TCI states other than the first TCI state. For example, in the case that the first TCI state is the TCI state with an identifier 5, and the set of TCI states is the set 320 of TCI states as shown in FIG. 3. The terminal device 120 will monitor BFD RS related to the TCI state with an identifier 5, and monitor CBD RS related to TCI states with identifiers 6, 7 and 8. It is to be understood that the network device 110 may transmit 725 to the terminal device 120 DL RS for each link periodically. The terminal device 120 monitors 730 BFD RS related to a first TCI state and monitors CBD RS related to each state in the set of TCI states other than the first TCI state periodically.

By doing so, the terminal device 120 does not require to monitor CBD RS related to each TCI states configured by the network device 110. The terminal device 120 may only monitor CBD RS related to each state other than the first TCI state in the set of TCI states comprising the first TCI state. By doing so, the terminal device complexity and power consumption will be reduced.

In some example embodiments, the terminal device 120 may determine, based on information about TCI state transition associated with the first TCI state, whether a probability of the first TCI state to be out of service in a predetermined or configured time period is higher than a first threshold. In accordance with a determination that the probability is higher than the first threshold, the terminal device 120 will monitor the CBD RS. For example, the terminal device 120 may monitor the set of TCI states not containing the first TCI state itself, or monitor the set of TCI states with the first TCI state ranked bottom. If the probability is lower than the first threshold, the terminal device 120 will not monitor the CBD RS. For example, the terminal device 120 may not monitor the set of TCI states containing the first TCI state and the first TCI state may be ranked top or first in the set of TCI states. The first threshold is configured or pre-configured. By doing so, the terminal device 120 may perform less CBD, thus further reduce the terminal device complexity and the power consumption.

In some example embodiments, the terminal device 120 may determine, based on information about TCI state transition associated with the first TCI state, whether a probability of the first TCI state to be out of service in a time period is lower than a second threshold. In accordance a determination that the probability is lower than the second threshold, the terminal device 120 may skip monitoring of the BFD RS and/or the CBD RS. By this way, the terminal device 120 may perform less BFD and/or CBD, thus will reduce the terminal device complexity and the power consumption.

Enhancements for BFD and CBD have been described with respect to FIG. 7. From now on, enhancements for BFD and BFR will be described with respect to FIG. 8.

Enhancements for BFD and BFR

Congenitally, in BFD, the physical layer may inform the higher layers when the radio link quality is worse than the threshold Qout, LR with a periodicity determined by the maximum between the shortest periodicity among the SS/PBCH blocks on the cell and/or the periodic CSI-RS configurations in the set q0 that the terminal device uses to assess the radio link quality and 2 msec. If BFI_COUNTER>=beamFailureInstanceMaxCount, beam failure is declared and BFRQ is triggered.

However, in some scenarios, obstacle will be moving periodically, it thus will cause false failure. As used hereinafter, the term "false failure" represents that the network device may not transmit to the terminal device since this blockage is known to the network device. However, the terminal device following the legacy procedure would declare failure and start BFRQ. The false failure and unnecessary BFRQ procedure will further waste terminal device power and UL resources. To this end, it will propose several approaches to improve the BFD and BFR according to the present disclosure to solve the above mentioned problems. Enhancements for BFD and BFR will be described with respect to FIG. 8.

Figure 8:
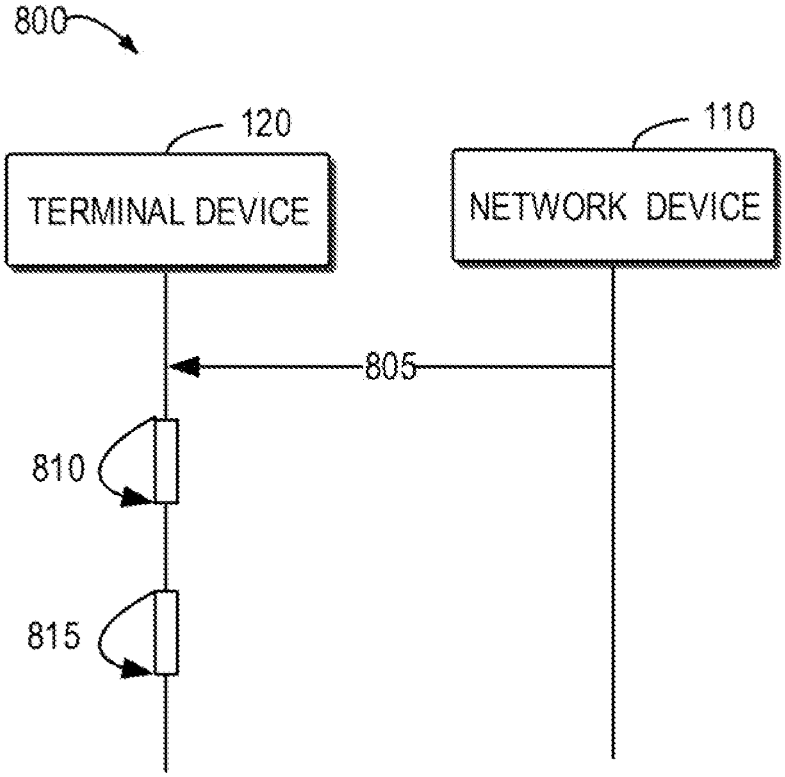
FIG. 8 illustrates another signaling flow for communication according to some example embodiments of the present disclosure.

Reference is now made to FIG. 8. FIG. 8 illustrates a signaling flow 800 for communication according to some example embodiments of the present disclosure. As shown in FIG. 8, the signaling flow 800 involves the terminal device 120 and the network device 110 as illustrated in FIG. 1. For the purpose of discussion, there are one terminal device and one network device illustrated in FIG. 8. It is to be understood that the signaling flow 800 may involves more terminal devices, or more network devices, and the number of terminal devices or network devices illustrated in FIG. 8 is only for the purpose of illustration without suggesting any limitations.

In operation, the network device 110 transmits 805, to the terminal device 120, an indication of BFD interruption. For example, the network device 110 may determine the BFD interruption based on predictive blocking obstacles or other rules. The rules for determining the BFD interruption may include but not limited to: report of other terminal devices, other assistance information from such as sensing, cameras, or planning at the network device side.

In some example embodiments, the network device 110 may transmit the indication of BFD interruption via configuration of DL RS for BFD. For example, the configuration of DL RS for BFD may comprise one of: at least one time domain location about a periodic DL RS associated with the BFD interruption, or a slot number or a frame number of the BFD interruption. For example, time domain location may be every n-th transmission occasions of this periodic DS RS, or every n1-th and every n2-th and every ni-th transmission occasions of this periodic DL RS. It is to be understood that n, n1, n2 and n2 may be any suitable numbers. For example, the BFD interruption may comprise every X (X may be any suitable number) time units. Time unit may be ms/frame/slot/mini-slot/symbol, etc.

In some example embodiments, the network device 110 may transmit the indication of BFD interruption via MAC CE or DCI indication. The MAC CE or DCI indication may inform the terminal device 120 to not count next several RS measurement. In addition, MAC CE or DCI indication may inform the terminal device 120 that the BFD interruption is ended.

After receiving the indication of BFD interruption, the terminal device 120 stops 810 increasing a counter of beam failure instance (BFI). For example, the terminal device 120 may stop increasing the counter of BFI at the time domain location or slot number or frame number indicated by the BFD interruption. In some example embodiments, the terminal device 120 may set the counter of BFI to 0.

The terminal device 120 resumes 815 the counter of BFI after the BFD interruption. For example, the terminal device 120 may resume the counter of BFI after the end of the BFD interruption indicated by the MAC CE or DCI indication.

Using the above described process, the terminal device may not to increase the counter of BFI based on the indication of BFD interruption, thus it will avoid the false failure by periodic blockage. By doing so, it will avoid the unnecessary BFRQ procedure, thus will reduce terminal device power consumption and save UL resources.

Example Methods and Devices

Figure 9:
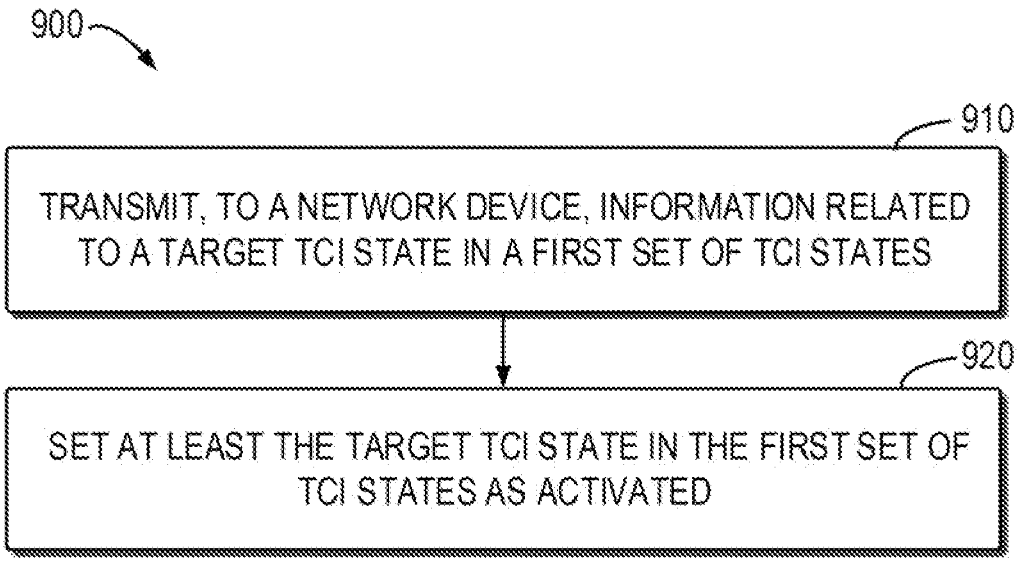
FIG. 9 illustrates a flowchart of an example method in accordance with some embodiments of the present disclosure.

Reference is now made to reference to FIG. 9. FIG. 9 illustrates a flowchart of an example method 900 in accordance with some embodiments of the present disclosure. The method 900 can be implemented at a terminal device 120 as shown in FIG. 1. It is to be understood that the method 900 may include additional blocks not shown and/or may omit some blocks as shown, and the scope of the present disclosure is not limited in this regard. For the purpose of discussion, the method 900 will be described from the perspective of the terminal device 120 with reference to FIG. 1.

At block 910, the terminal device 120 transmits, to a network device 110, information related to a target TCI state in a first set of TCI states for transmission between the terminal device 120 and the network device 110. The first set of TCI states is at least partially non-overlapping with a second set of TCI states which have been activated. The target TCI state is outside the second set of TCI states. At block 920, the terminal device 120 sets at least the target TCI state in the first set of TCI states as activated.

In some example embodiments, transmitting the information related to the target TCI state comprises: transmitting the information related to the target TCI state if at least one of the following conditions is met: a first channel quality associated with the target TCI state is higher than a threshold quality; the first channel quality is higher than a second channel quality associated with a current TCI state in the second set of TCI states, wherein a channel with the current TCI state is being monitored by the terminal device 120; the first channel quality is higher than the second channel quality with an offset; and the first channel quality is higher than the second channel quality with an offset for a plurality of times.

In some example embodiments, transmitting the information related to the target TCI state comprises: transmitting the information related to the target TCI state on a reporting resource on at least one of: PUCCH, PUSCH, or PRACH.

In some example embodiments, the method 900 further comprises: receiving, from the network device 110, a confirmation concerning reception of the information related to the target TCI state.

In some example embodiments, the reporting resource is multiplexed with a resource for beam report, CSI report or beam failure recovery request, BFRQ; or the reporting resource is a dedicated resource reserved for the terminal device to transmit the information related to the target TCI state.

In some example embodiments, transmitting the information related to the target TCI state comprises at least one of: transmitting SSBRI or CRI, related to the target TCI state; transmitting SSBRI or CRI related to the target TCI state with an indication for beam switching; or transmitting information about the first set of TCI states.

In some example embodiments, transmitting the information related to the target TCI state comprises: transmitting the information to trigger at least one of: channel acquisition procedure or fine-tuning procedure; wherein the channel acquisition procedure comprises one of the following: SRS associated with terminal device report for the channel acquisition; or CSI report associated with terminal device report the channel acquisition; and wherein the fine-tuning procedure comprises tracking reference signal, TRS, transmission for fine-tuning.

In some example embodiments, setting at least the target TCI state in the first set of TCI states as activated comprises: monitoring a PDCCH with the target TCI state.

In some example embodiments, setting at least the one target TCI state in the first set of TCI states as activated comprises: in response to receiving from the network device 110 a confirmation that the target TCI state will be used for a future transmission, starting to monitor a PDCCH with the target TCI state.

In some example embodiments, setting at least the target TCI state in the first set of TCI states as activated comprises: setting the target TCI state in the first set of TCI states as activated; and updating a mapping relationship between TCI state identifier and TCI codepoint in downlink control information, DCI, with an identifier of the target TCI state.

In some example embodiments, setting at least the target TCI state in the first set of TCI states as activated comprises: setting each TCI state in the first set of TCI states as activated; and updating a mapping relationship between TCI state identifier and TCI codepoint in downlink control information, DCI, with an identifier of each TCI state in the first set of TCI states.

In some example embodiments, the method 900 further comprises: setting at least one TCI state in the second set of TCI states as inactive.

In some example embodiments, the first set of TCI states and the second set of TCI states are non-overlapping. The method 900 further comprises: receiving, from the network device 110, a TCI state set configuration indicating at least the first set of TCI states and the second set of TCI states.

In some example embodiments, the method 900 further comprises: receiving, from the network device 110, a TCI state set configuration indicating at least the first set of TCI states and the second set of TCI states; wherein a first TCI state is associated with the first set of TCI states, and a second TCI state is associated with the second set of TCI states.

In some example embodiments, the method 900 further comprises: receiving, from the network device 110, an indication concerning a rule of TCI state set configuration, the TCI state set configuration indicating at least the first set of TCI states and the second set of TCI states.

In some example embodiments, the method 900 further comprises: monitoring BFD RS, related to a first TCI state in the first set of TCI states, wherein a channel with the first TCI state is being monitored by the terminal device 120; and monitoring CBD RS related to each state in the first set of TCI states other than the first TCI state.

In some example embodiments, the method 900 further comprises: before transmitting the information related to the target TCI state: monitoring BFD RS related to a second TCI state in the second set of TCI states, wherein a channel with the second TCI state is being monitored by the terminal device 120; and monitoring CBD RS related to each state in the second set of TCI states other than the second TCI state.

Figure 10:
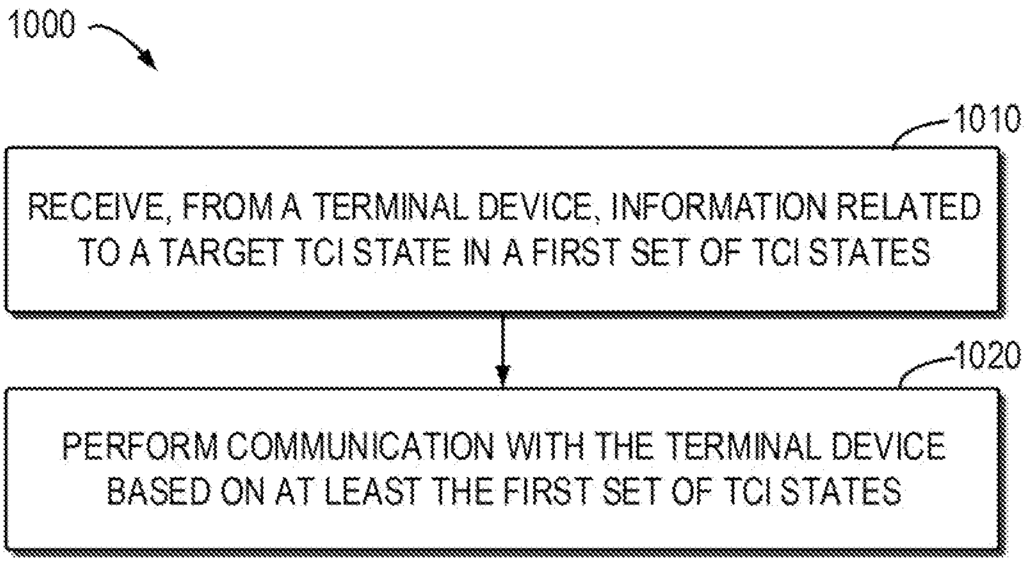
FIG. 10 illustrates another flowchart of an example method in accordance with some embodiments of the present disclosure.

FIG. 10 illustrates a flowchart of an example method 1000 in accordance with some embodiments of the present disclosure. The method 1000 can be implemented at the network device 110 as shown in FIG. 1. It is to be understood that the method 1000 may include additional blocks not shown and/or may omit some blocks as shown, and the scope of the present disclosure is not limited in this regard. For the purpose of discussion, the method 1000 will be described from the perspective of the network device 110 with reference to FIG. 1.

At block 1010, the network device 110 receives, from a terminal device 120, information related to a target TCI state belonging to a first set of TCI states for transmission between the terminal device 120 and the network device 110. The first set of TCI states is at least partially non-overlapping with a second set of TCI states which have been activated. The target TCI state is outside the second set of TCI states. At block 1020, the network device 110 performs communication with the terminal device 120 based on at least the first set of TCI states.

In some example embodiments, receiving the information related to the target TCI state comprises: receiving the information related to the target TCI state on a reporting resource on at least one of: PUCCH, PUSCH or PRACH.

In some example embodiments, the method 1000 further comprises: transmitting, to the terminal device 120, a confirmation concerning reception of the information related to the target TCI state.

In some example embodiments, the reporting resource is multiplexed with a resource for beam report, CSI report or beam failure recovery request, BFRQ; or the reporting resource is a dedicated resource reserved for the terminal device to transmit the information related to the target TCI state.

In some example embodiments, receiving the information related to the target TCI state comprises at least one of: receiving SSBRI or CRI, related to the target TCI state; receiving SSBRI or CRI related to the target TCI state with an indication for beam switching; or receiving information about the first set of TCI states.

In some example embodiments, receiving the information related to the target TCI state comprises: receiving the information to trigger at least one of: channel acquisition procedure or fine-tuning procedure; wherein the channel acquisition procedure comprises one of the following: sounding reference signal, SRS, associated with terminal device report for the channel acquisition; or channel state information, CSI, report associated with terminal device report the channel acquisition; and wherein the fine-tuning procedure comprises tracking reference signal, TRS, transmission for fine-tuning.

In some example embodiments, the method 1000 further comprises: transmitting, to the network device, a TCI state set configuration indicating at least the first set of TCI states and the second set of TCI states.

In some example embodiments, the first set of TCI states and the second set of TCI states are non-overlapping, and wherein the TCI state set configuration is determined by the network device based on at least one of: position association associated with each TCI state of at least the first set of TCI states and the second set of TCI states, or information about TCI state transition associated with each TCI state of at least the first set of TCI states and the second set of TCI states.

In some example embodiments, the method 1000 further comprises: configuring, the first set of TCI states based on information about TCI state transition associated with a first TCI state; and configuring, the second set of TCI states based on information about TCI state transition associated with a second TCI state.

In some example embodiments, the method 1000 further comprises: transmitting, to the terminal device, an indication concerning a rule of TCI state set configuration, the TCI state set configuration indicating at least the first set of TCI states and the second set of TCI states.

In some example embodiments, the method 1000 further comprises: updating a mapping relationship between TCI state identifier and TCI codepoint in downlink control information, DCI, with an identifier of the target TCI state.

In some example embodiments, the method 1000 further comprises: updating a mapping relationship between TCI state identifier and TCI codepoint in downlink control information, DCI, with an identifier of each TCI state in the first set of TCI states.

Figure 11:
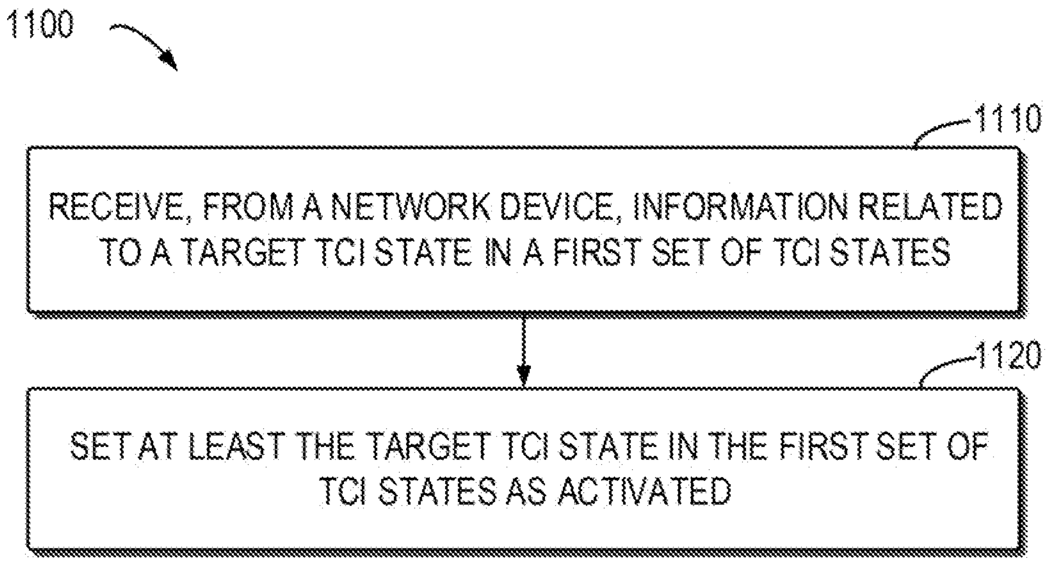
FIG. 11 illustrates another flowchart of an example method in accordance with some embodiments of the present disclosure.

Reference is now made to reference to FIG. 11. FIG. 11 illustrates a flowchart of an example method 1100 in accordance with some embodiments of the present disclosure. The method 1100 can be implemented at a terminal device 120 as shown in FIG. 1. It is to be understood that the method 1100 may include additional blocks not shown and/or may omit some blocks as shown, and the scope of the present disclosure is not limited in this regard. For the purpose of discussion, the method 1100 will be described from the perspective of the terminal device 120 with reference to FIG. 1.

At block 1110, the terminal device 120 receives, from a network device 110, information related to a target TCI state in a first set of TCI states for transmission between the terminal device 120 and the network device 110. The first set of TCI states is at least partially non-overlapping with a second set of TCI states which have been activated. At block 1120, the terminal device 120 sets at least the target TCI state in the first set of TCI states as activated.

Figure 12:
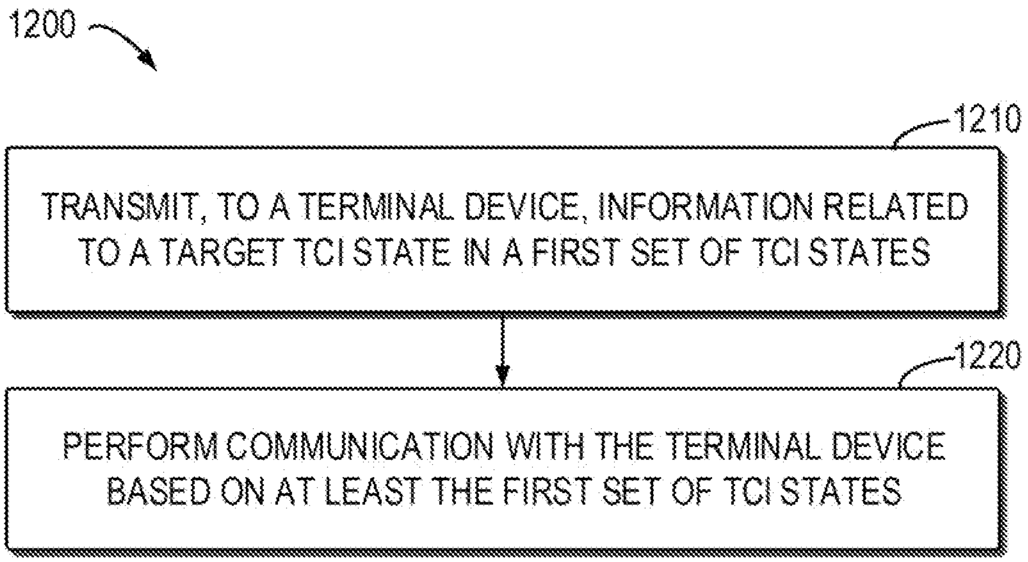
FIG. 12 illustrates another flowchart of an example method in accordance with some embodiments of the present disclosure.

FIG. 12 illustrates a flowchart of an example method 1200 in accordance with some embodiments of the present disclosure. The method 1200 can be implemented at the network device 110 as shown in FIG. 1. It is to be understood that the method 1200 may include additional blocks not shown and/or may omit some blocks as shown, and the scope of the present disclosure is not limited in this regard. For the purpose of discussion, the method 1200 will be described from the perspective of the network device 110 with reference to FIG. 1.

At block 1210, the network device 110 transmits, to a terminal device 120, information related to a target TCI state belonging to a first set of TCI states for transmission between the terminal device 120 and the network device 110. The first set of TCI states is at least partially non-overlapping with a second set of TCI states which have been activated. At block 1220, the network device 110 performs communication with the terminal device 120 based on at least the first set of TCI states.

Figure 13:
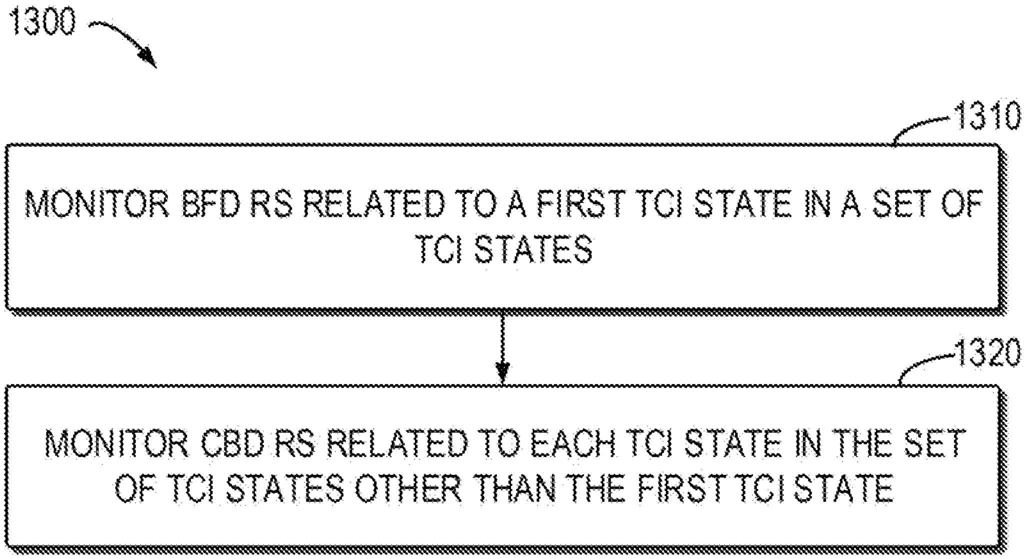
FIG. 13 illustrates another flowchart of an example method in accordance with some embodiments of the present disclosure.

Reference is now made to reference to FIG. 13. FIG. 13 illustrates a flowchart of an example method 1300 in accordance with some embodiments of the present disclosure. The method 1300 can be implemented at a terminal device 120 as shown in FIG. 1. It is to be understood that the method 1300 may include additional blocks not shown and/or may omit some blocks as shown, and the scope of the present disclosure is not limited in this regard. For the purpose of discussion, the method 1300 will be described from the perspective of the terminal device 120 with reference to FIG. 1.

At block 1310, the terminal device 120 monitors beam failure detection, BFD, reference signal, RS, related to a first TCI state in a set of TCI states. A channel with the first TCI state is being monitored by the terminal device 120. At block 1320, the terminal device 120 monitors candidate beam detection, CBD, RS related to each TCI state in the set of TCI states other than the first TCI state.

Figure 14:
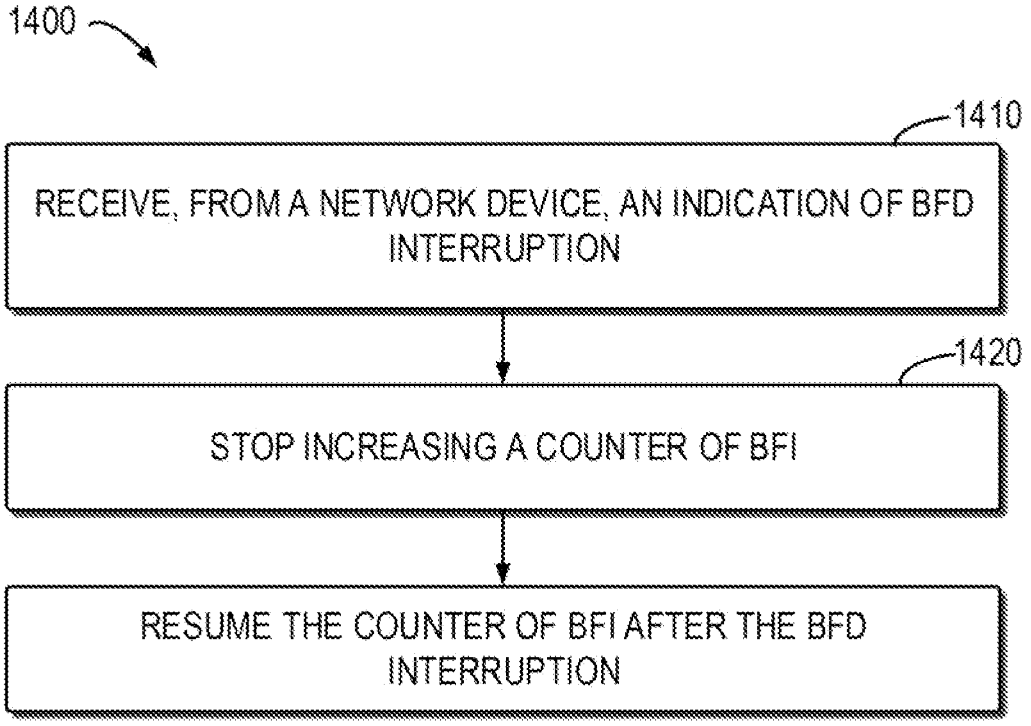
FIG. 14 illustrates another flowchart of an example method in accordance with some embodiments of the present disclosure.

Reference is now made to reference to FIG. 14. FIG. 14 illustrates a flowchart of an example method 1400 in accordance with some embodiments of the present disclosure. The method 1400 can be implemented at a terminal device 120 as shown in FIG. 1. It is to be understood that the method 1400 may include additional blocks not shown and/or may omit some blocks as shown, and the scope of the present disclosure is not limited in this regard. For the purpose of discussion, the method 1400 will be described from the perspective of the terminal device 120 with reference to FIG. 1.

At block 1410, the terminal device 120 receives, from a network device 110, an indication of beam failure detection, BFD, interruption. At block 1420, the terminal device 120 stops increasing a counter of beam failure instance, BFI. At block 1430, the terminal device 120 resumes the counter of BFI after the interruption.

Figure 15:
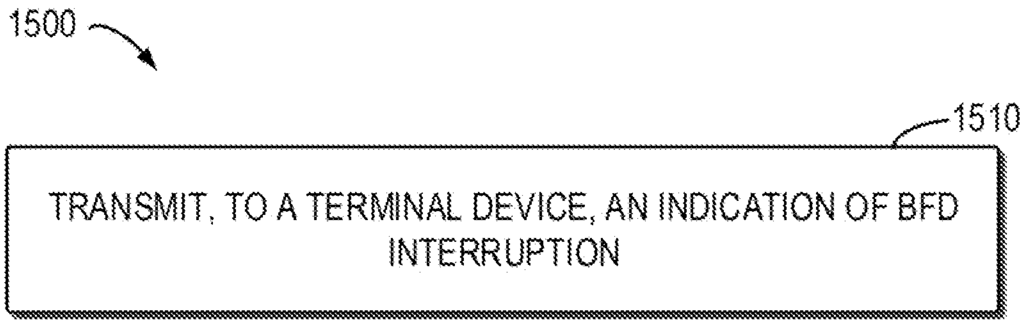
FIG. 15 illustrates another flowchart of an example method in accordance with some embodiments of the present disclosure.

FIG. 15 illustrates a flowchart of an example method 1500 in accordance with some embodiments of the present disclosure. The method 1500 can be implemented at the network device 110 as shown in FIG. 1. It is to be understood that the method 1500 may include additional blocks not shown and/or may omit some blocks as shown, and the scope of the present disclosure is not limited in this regard. For the purpose of discussion, the method 1500 will be described from the perspective of the network device 110 with reference to FIG. 1.

At block 1510, the network device 110 transmits, to a terminal device 120, an indication of beam failure detection, BFD, interruption.

Details for beam management enhancement according to the present disclosure have been described with reference to FIGS. 1-15. Now an example implementation of the terminal device 120 will be discussed below. In some embodiments, a terminal device (for example, the terminal device 120) comprises circuitry configured to: transmit, to a network device, information related to a target TCI state in a first set of TCI states for transmission between the terminal device and the network device, the first set of TCI states being at least partially non-overlapping with a second set of TCI states which have been activated, the target TCI state being outside the second set of TCI states; and set at least the target TCI state in the first set of TCI states as activated.

In some example embodiments, in transmitting the information related to the target TCI state, the circuitry is configured to: transmit the information related to the target TCI state if at least one of the following conditions is met: a first channel quality associated with the target TCI state is higher than a threshold quality; the first channel quality is higher than a second channel quality associated with a current TCI state in the second set of TCI states, wherein a channel with the current TCI state is being monitored by the terminal device; the first channel quality is higher than the second channel quality with an offset; and the first channel quality is higher than the second channel quality with an offset for a plurality of times.

In some example embodiments, in transmitting the information related to the target TCI state, the circuitry is configured to: transmit the information related to the target TCI state on a reporting resource on at least one of: PUCCH, PUSCH, or PRACH.

In some example embodiments, the circuitry is further configured to: receive from the network device, a confirmation concerning reception of the information related to the target TCI state.

In some example embodiments, the reporting resource is multiplexed with a resource for beam report, CSI report or beam failure recovery request, BFRQ; or the reporting resource is a dedicated resource reserved for the terminal device to transmit the information related to the target TCI state.

In some example embodiments, in transmitting the information related to the target TCI state, the circuitry is configured to at least one of: transmit SSBRI or CRI, related to the target TCI state; transmit SSBRI or CRI related to the target TCI state with an indication for beam switching; or transmit information about the first set of TCI states.

In some example embodiments, in transmitting the information related to the target TCI state, the circuitry is configured to: transmit the information to trigger at least one of: channel acquisition procedure or fine-tuning procedure; wherein the channel acquisition procedure comprises one of the following: SRS associated with terminal device report for the channel acquisition; or CSI report associated with terminal device report the channel acquisition; and wherein the fine-tuning procedure comprises tracking reference signal, TRS, transmission for fine-tuning.

In some example embodiments, in setting at least the target TCI state in the first set of TCI states as activated, the circuitry is configured to: monitor a PDCCH with the target TCI state.

In some example embodiments, in setting at least the one target TCI state in the first set of TCI states as activated, the circuitry is configured to: in response to receiving from the network device a confirmation that the target TCI state will be used for a future transmission, start to monitor a PDCCH with the target TCI state.

In some example embodiments, in setting at least the target TCI state in the first set of TCI states as activated, the circuitry is configured to: sett the target TCI state in the first set of TCI states as activated; and update a mapping relationship between TCI state identifier and TCI codepoint in downlink control information, DCI, with an identifier of the target TCI state.

In some example embodiments, in setting at least the target TCI state in the first set of TCI states as activated, the circuitry is configured to: set each TCI state in the first set of TCI states as activated; and update a mapping relationship between TCI state identifier and TCI codepoint in downlink control information, DCI, with an identifier of each TCI state in the first set of TCI states.

In some example embodiments, the circuitry is further configured to: set at least one TCI state in the second set of TCI states as inactive.

In some example embodiments, the first set of TCI states and the second set of TCI states are non-overlapping. The circuitry is further configured to: receive, from the network device, a TCI state set configuration indicating at least the first set of TCI states and the second set of TCI states.

In some example embodiments, the circuitry is further configured to: receive, from the network device, a TCI state set configuration indicating at least the first set of TCI states and the second set of TCI states; wherein a first TCI state is associated with the first set of TCI states, and a second TCI state is associated with the second set of TCI states.

In some example embodiments, the circuitry is further configured to: receive, from the network device, an indication concerning a rule of TCI state set configuration, the TCI state set configuration indicating at least the first set of TCI states and the second set of TCI states.

In some example embodiments, the circuitry is further configured to: monitor BFD RS, related to a first TCI state in the first set of TCI states, wherein a channel with the first TCI state is being monitored by the terminal device; and monitor CBD RS related to each state in the first set of TCI states other than the first TCI state.

In some example embodiments, the circuitry is further configured to: before transmitting the information related to the target TCI state: monitor BFD RS related to a second TCI state in the second set of TCI states, wherein a channel with the second TCI state is being monitored by the terminal device; and monitor CBD RS related to each state in the second set of TCI states other than the second TCI state.

In some embodiments, a network device (for example, the network device 110) comprises circuitry configured to: receive, from a terminal device, information related to a target TCI state belonging to a first set of TCI states for transmission between the terminal device 120 and the network device 110, the first set of TCI states being at least partially non-overlapping with a second set of TCI states which have been activated, the target TCI state being outside the second set of TCI states; and perform communication with the terminal device 120 based on at least the first set of TCI states.

In some example embodiments, in receiving the information related to the target TCI state, the circuitry is configured to: receive the information related to the target TCI state on a reporting resource on at least one of: PUCCH, PUSCH or PRACH.

In some example embodiments, the circuitry is further configured to: transmit, to the terminal device 120, a confirmation concerning reception of the information related to the target TCI state.

In some example embodiments, the reporting resource is multiplexed with a resource for beam report, CSI report or beam failure recovery request, BFRQ; or the reporting resource is a dedicated resource reserved for the terminal device to transmit the information related to the target TCI state.

In some example embodiments, in receiving the information related to the target TCI state, the circuitry is configured to at least one of: receive SSBRI or CRI, related to the target TCI state; receive SSBRI or CRI related to the target TCI state with an indication for beam switching; or receive information about the first set of TCI states.

In some example embodiments, in receiving the information related to the target TCI state, the circuitry is configured to: receive the information to trigger at least one of: channel acquisition procedure or fine-tuning procedure; wherein the channel acquisition procedure comprises one of the following: sounding reference signal, SRS, associated with terminal device report for the channel acquisition; or channel state information, CSI, report associated with terminal device report the channel acquisition; and wherein the fine-tuning procedure comprises tracking reference signal, TRS, transmission for fine-tuning.

In some example embodiments, the circuitry is further configured to: transmit, to the network device, a TCI state set configuration indicating at least the first set of TCI states and the second set of TCI states.

In some example embodiments, the first set of TCI states and the second set of TCI states are non-overlapping, and wherein the TCI state set configuration is determined by the network device based on at least one of: position association associated with each TCI state of at least the first set of TCI states and the second set of TCI states, or information about TCI state transition associated with each TCI state of at least the first set of TCI states and the second set of TCI states.

In some example embodiments, the circuitry is further configured to: configure, the first set of TCI states based on information about TCI state transition associated with a first TCI state; and configure, the second set of TCI states based on information about TCI state transition associated with a second TCI state.

In some example embodiments, the circuitry is further configured to: transmit, to the terminal device, an indication concerning a rule of TCI state set configuration, the TCI state set configuration indicating at least the first set of TCI states and the second set of TCI states.

In some example embodiments, the circuitry is further configured to: update a mapping relationship between TCI state identifier and TCI codepoint in downlink control information, DCI, with an identifier of the target TCI state.

In some example embodiments, the circuitry is further configured to: update a mapping relationship between TCI state identifier and TCI codepoint in downlink control information, DCI, with an identifier of each TCI state in the first set of TCI states.

In some embodiments, a terminal device (for example, the terminal device 120) comprises circuitry configured to: receive, from a network device, information related to a target TCI state in a first set of TCI states for transmission between the terminal device and the network device, the first set of TCI states being at least partially non-overlapping with a second set of TCI states which have been activated; and set at least the target TCI state in the first set of TCI states as activated.

In some example embodiments, in setting at least the target TCI state in the first set of TCI states as activated, the circuitry is configured to: monitor a physical downlink control channel, PDCCH, with the target TCI state.

In some example embodiments, in setting at least the target TCI state in the first set of TCI states as activated, the circuitry is configured to: set the target TCI state in the first set of TCI states as activated; and update a mapping relationship between TCI state identifier and TCI codepoint in downlink control information, DCI, with an identifier of the target TCI state.

In some example embodiments, in setting at least the target TCI state in the first set of TCI states as activated, the circuitry is configured to: set each TCI state in the first set of TCI states as activated; and update a mapping relationship between TCI state identifier and TCI codepoint in downlink control information, DCI, with an identifier of each TCI state in the first set of TCI states.

In some example embodiments, the circuitry is further configured to: set at least one TCI state in the second set of TCI states as inactive.

In some example embodiments, the circuitry is further configured to: receive, from the network device, an indication concerning a rule of TCI state set configuration.

In some example embodiments, the rule of TCI state set configuration comprises information about a sliding window.

In some example embodiments, in receiving information related to the target TCI state, the circuitry is configured to: receive, from the network device, a TCI state identifier for the target TCI state.

In some example embodiments, in receiving the TCI state identifier for the target TCI state, the circuitry is configured to: receive the TCI state identifier via downlink control information, DCI; or receive the TCI state identifier via medium address control, MAC, control element, CE.

In some example embodiments, the circuitry is further configured to: monitor beam failure detection, BFD, reference signal, RS, related to a first TCI state in the first set of TCI states, wherein a channel with the first TCI state is being monitored by the terminal device; and monitor candidate beam detection, CBD, RS related to each state in the first set of TCI states other than the first TCI state.

In some example embodiments, the circuitry is further configured to: before receiving the information related to the target TCI state: monitor beam failure detection, BFD, reference signal, RS, related to a second TCI state in the second set of TCI states, wherein a channel with the second TCI state is being monitored by the terminal device; and monitor candidate beam detection, CBD, RS related to each state in the second set of TCI states other than the second TCI state.

In some embodiments, a network device (for example, the network device 110) comprises circuitry configured to: transmit, to a terminal device, information related to a target TCI state belonging to a first set of TCI states for transmission between the terminal device 120 and the network device 110, the first set of TCI states being at least partially non-overlapping with a second set of TCI states which have been activated; and perform communication with the terminal device 120 based on at least the first set of TCI states.

In some example embodiments, the circuitry is further configured to: transmit, to the terminal device, an indication concerning a rule of TCI state set configuration.

In some example embodiments, the rule of TCI state set configuration comprises information about a sliding window.

In some example embodiments, in transmitting the information related to the target TCI state, the circuitry is configured to: transmit, to the terminal device, a TCI state identifier for the target TCI state.

In some example embodiments, in transmitting the TCI state identifier for the target TCI state, the circuitry is configured to: transmit the TCI state identifier via downlink control information, DCI; or transmit the TCI state identifier via medium address control, MAC, control element, CE.

In some embodiments, a terminal device (for example, the terminal device 120) comprises circuitry configured to: monitor beam failure detection, BFD, reference signal, RS, related to a first TCI state in a set of TCI states, wherein a channel with the first TCI state is being monitored by the terminal device; and monitor candidate beam detection, CBD, RS related to each TCI state in the set of TCI states other than the first TCI state.

In some example embodiments, in monitoring the CBD RS, the circuitry is configured to: determine, based on information about TCI state transition associated with the first TCI state, whether a probability of the first TCI state to be out of service in a predetermined time period is higher than a first threshold; and in accordance with a determination that the probability is higher than the first threshold, monitor the CBD RS.

In some example embodiments, the circuitry is further configured to: determine, based on information about TCI state transition associated with the first TCI state, whether a probability of the first TCI state to be out of service in a predetermined time period is lower than a second threshold; and in accordance with a determination that the probability is lower than the second threshold, skip monitoring of the BFD RS and/or the CBD RS.

In some example embodiments, the circuitry is further configured to: receive, from a network device, a configuration for beam failure recovery, BFR, the configuration indicates at least the set of TCI states.

In some embodiments, a terminal device (for example, the terminal device 120) comprises circuitry configured to: receive, from a network device, an indication of beam failure detection, BFD, interruption; stop increasing a counter of beam failure instance, BFI; and resume the counter of BFI after the BFD interruption.

In some example embodiments, in receiving the indication of BFD interruption, the circuitry is configured to: receive the indication of BFD interruption via configuration of downlink, DL, reference signal, RS, for BFD; receive the indication of BFD interruption via medium address control, MAC, control element, CE; or receive the indication of BFD interruption via downlink control information, DCI, indication.

In some example embodiments, the configuration of DL RS for BFD comprises one of: at least one time domain location about a periodic DL RS associated with the BFD interruption, or a slot number or a frame number of the BFD interruption.

In some embodiments, a network device (for example, the network device 110) comprises circuitry configured to: transmit, to a terminal device, an indication of beam failure detection, BFD, interruption.

In some example embodiments, in transmitting the indication of BFD interruption, the circuitry is configured to: transmit the indication of BFD interruption via configuration of downlink, DL, reference signal, RS, for BFD; transmit the indication of BFD interruption via medium address control, MAC, control element, CE; or transmit the indication of BFD interruption via downlink control information, DCI, indication.

In some example embodiments, the configuration of DL RS for BFD comprises one of: at least one time domain location about a periodic DL RS associated with the BFD interruption, or a slot number or a frame number of the BFD interruption.

In some example embodiments, the circuitry is further configured to: determine the indication of BFD interruption based on at least one of: report of other terminal devices, assistance information from sensing or cameras, or planning at the network device.

Figure 16:
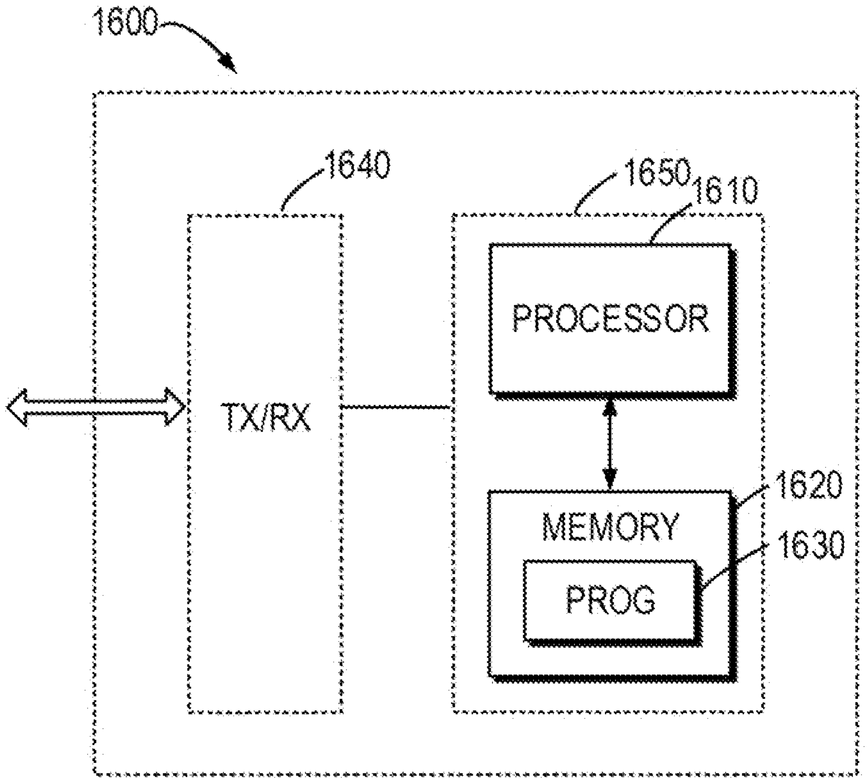
FIG. 16 is a simplified block diagram of a device that is suitable for implementing embodiments of the present disclosure.

FIG. 16 is a simplified block diagram of a device 1600 that is suitable for implementing embodiments of the present disclosure. The device 1600 can be considered as a further example implementation of the network device 110 or the terminal device 120 as shown in FIG. 1. Accordingly, the device 1600 can be implemented at or as at least a part of the network device 110 or the terminal device 120.

As shown, the device 1600 includes a processor 1610, a memory 1620 coupled to the processor 1610, a suitable transmitter (TX) and receiver (RX) 1640 coupled to the processor 1610, and a communication interface coupled to the TX/RX 1640. The memory 1610 stores at least a part of a program 1630. The TX/RX 1640 is for bidirectional communications. The TX/RX 1640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1630 is assumed to include program instructions that, when executed by the associated processor 1610, enable the device 1600 to operate in accordance with the embodiments of the present disclosure, as discussed herein with reference to FIGS. 1 to 15. The embodiments herein may be implemented by computer software executable by the processor 1610 of the device 1600, or by hardware, or by a combination of software and hardware. The processor 1610 may be configured to implement various embodiments of the present disclosure. Furthermore, a combination of the processor 1610 and memory 1620 may form processing means 1650 adapted to implement various embodiments of the present disclosure.

The memory 1620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1620 is shown in the device 1600, there may be several physically distinct memory modules in the device 1600. The processor 1610 may be of any type suitable to the local technical network, and may include one or more of general purpose computers, special purpose computers, microprocessors, digital signal processors (DSPs) and processors based on multicore processor architecture, as non-limiting examples. The device 1600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any one of FIGS. 9-15 or any combinations thereof. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A user equipment comprising:
- one or more memories configured to store instructions; and
- one or more processors configured to execute the instructions to:
  - transmit, to a network device, information for initiating channel state information (CSI) reporting; and
  - transmit, to the network device, at least one of a CSI reference signal resource indicator (CRI), and a synchronization signal/physical broadcast channel block resource indicator (SSBRI) for the CSI reporting,
  - wherein the information is transmitted in a case where a first reference signal received power (RSRP) related to a new reference signal exceeds a second RSRP related to a reference signal in a current transmission configuration indicator (TCI) state.

2. A method performed by a user equipment, the method comprising:
- transmitting, to a network device, information for initiating channel state information (CSI) reporting; and
- transmitting, to the network device, at least one of a CSI reference signal resource indicator (CRI), and a synchronization signal/physical broadcast channel block resource indicator (SSBRI) for the CSI reporting,
- wherein the information is transmitted in a case where a first reference signal received power (RSRP) related to a new reference signal exceeds a second RSRP related to a reference signal in a current transmission configuration indicator (TCI) state.

* * * * *